United States Patent [19]

Yokoyama et al.

[11] Patent Number: 5,283,615
[45] Date of Patent: Feb. 1, 1994

[54] IMAGE FORMING APPARATUS HAVING A PLURALITY OF DEVELOPING DEVICES

[75] Inventors: Tomoaki Yokoyama, Toyokawa; Tateki Oka, Toyohashi; Kunio Toda, Itami, all of Japan

[73] Assignee: Minolta Camera Kabushiki Kaisha, Osaka, Japan

[21] Appl. No.: 595,570

[22] Filed: Oct. 11, 1990

[30] Foreign Application Priority Data

Oct. 13, 1989 [JP] Japan .................. 1-266652
Oct. 13, 1989 [JP] Japan .................. 1-266658
Nov. 30, 1989 [JP] Japan .................. 1-311512

[51] Int. Cl.$^5$ ......................................... G03G 15/06
[52] U.S. Cl. ............................ 355/245; 118/645; 118/652; 355/326 R
[58] Field of Search ............... 355/269, 270, 245, 326, 355/251, 253, 327, 264, 261, 265, 296, 305; 118/645, 657, 656, 658, 652; 430/45

[56] References Cited

U.S. PATENT DOCUMENTS

| 4,351,604 | 9/1982 | Karawasa et al. | 355/326 |
| 4,422,405 | 12/1982 | Kasahara et al. | 355/251 |
| 4,545,325 | 10/1985 | Komatsu et al. | 118/645 |
| 4,618,243 | 10/1986 | Knapp | 355/251 |
| 4,671,641 | 6/1987 | Kohyama | 355/251 |
| 4,774,543 | 9/1988 | Yoshikawa et al. | 355/326 |
| 4,822,702 | 4/1989 | Hoshi et al. | 430/42 |
| 4,876,574 | 10/1989 | Tajima et al. | 355/265 X |
| 4,933,721 | 6/1990 | Yasuda et al. | 355/326 X |
| 5,063,127 | 11/1991 | Oka et al. | 430/45 |

FOREIGN PATENT DOCUMENTS

| 58-102251 | 6/1983 | Japan . |
| 0184979 | 10/1983 | Japan .................. 355/305 |
| 60-143363 | 7/1985 | Japan . |

Primary Examiner—Joan H. Pendegrass
Assistant Examiner—Robert Beatty
Attorney, Agent, or Firm—Burns, Doane, Swecker & Mathis

[57] ABSTRACT

An image forming apparatus is provided with an optical system for forming a first electrostatic latent image and a second electrostatic latent image on a rotatable photosensitive member, a first developing device accommodating a first developer for developing the first electrostatic latent image, and a second developing device accommodating a second developer for developing the second electrostatic latent image. The second developing device is located downstream from the first developing device in a direction of rotation of the photosensitive member and is provided with a developing roller having a magnetic force. The second developer differs in color from the first developer and has a magnetism greater than the first developer. The second developer is transported to the second electrostatic latent image along a periphery of the developing roller. The image forming apparatus is further provided with a collector provided in the second developing device and having a collecting member confronting the developing roller. The first developer mixed in the second developer is moved toward and collected by the collecting member under the influence of an electric field formed between the collecting member and developing roller. Alternatively, the photosensitive member can act as a collector for collecting first developer mixed in the second developer.

34 Claims, 14 Drawing Sheets

1ST CHARGING

1ST EXPOSURE

1ST DEVELOP.

2ND CHARGING

2ND EXPOSURE

2ND DEVELOP.

Fig. 11a   1ST CHARGING
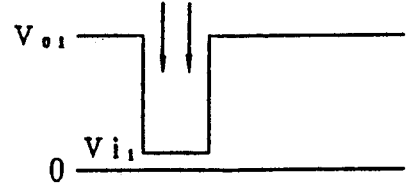
Fig. 11b   1ST EXPOSURE
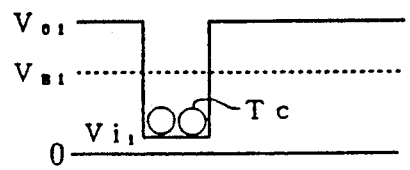
Fig. 11c   1ST DEVELOP.
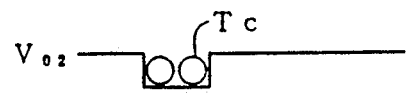
Fig. 11d   2ND CHARGING
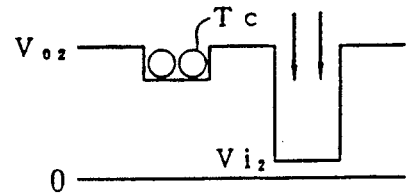
Fig. 11e   2ND EXPOSURE
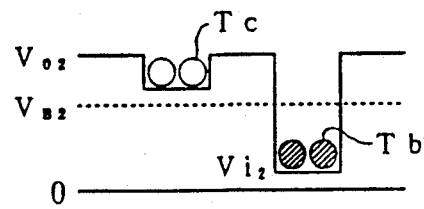
Fig. 11f   2ND DEVELOP.
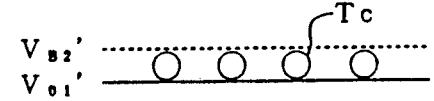
Fig. 11g   TONER SEPARATION

IMAGE FORMING APPARATUS HAVING A PLURALITY OF DEVELOPING DEVICES

BACKGROUND OF THE INVENTION

1. Field of the Invention

The present invention generally relates to an image forming apparatus for electrophotographically forming an image and, more particularly, to an image forming apparatus provided with a plurality of developing devices each containing toner of a different color.

2. Description of the Related Art

An image forming apparatus, in which a plurality of toner images of different colors are transferred all together onto a transfer material, is known. For example, when toners of two different colors are used in such an image forming apparatus, a first electrostatic latent image formed on the surface of a photosensitive body is initially developed by the first toner contained in a first developing device. A second electrostatic latent image is then developed in an overlapping manner by the second toner of the same polarity as the first toner in a second developing device. Thereafter, toner images formed by the first and second toners are both transferred onto a transfer material. According to this type of apparatus, since it is so arranged that the first toner image passes a developing area of the second developing device, part of the toner of the first image is disadvantageously scraped off by the action of a magnetic brush of a second developer material including the second toner and eventually mixed into the second developing device. As a result, image quality is deteriorated due to the mixture of first and second toners.

In order to avoid the above-described disadvantage, such a proposal is heretofore made that the first and second toners consist of non-magnetic toner and magnetic toner, respectively. Alternatively, both the first and the second toners are rendered magnetic, but the second toner consists of toner of higher magnetism than the first toner. The first toner can accordingly be selectively collected because of the difference in developing threshold value between the first and second toners.

However, according to the above-proposed method, not only the first toner is collected from among the second developer material, but the second toner is adhered to a collecter by the mechanical force such as the adhesive force thereof or the like to the collecter. In this case, there arises no problem if the amount of the second toner adhered to the collecter is considerably small. In the above-described conventional method, however, the second toner is actually collected up to 10–20% of the whole collected toner. Therefore, a good deal of the second toner is wasted without being served for the development.

In the meantime, Japanese Patent Laid-open Publication (unexamined) No. 58-137846 proposes a method for separating and collecting the first toner mixed into the second developing device. The order of frictional electrification is suitably set for the first toner, the second toner and carrier according to this method, so that the first toner mixed into the second developer material may be separated from the carrier by reversing the polarity thereof to a polarity opposite to the second toner. The separated first toner is scattered out of the developing device or collected at a non-image area of the photosensitive body or by a collecting roller.

However, the above method also has the following disadvantages. That is, the control in the order of electrification is required, which narrows in many cases the allowance of the composition of toner. Since the electrification is closely related to environments, particularly humidity, the image forming apparatus should be installed at a proper place so that the resulting images may not be subject to variation. Moreover, the scattered first toner may spoil the inside of the image forming apparatus.

SUMMARY OF THE INVENTION

Accordingly, the present invention has been developed with a view to substantially eliminating the above-described disadvantages inherent in the prior art image forming apparatus, and has for its essential object to provide an improved image forming apparatus wherein toner mixed into a developing device containing different toner is effectively separated and collected.

In accomplishing this and other objects, an image forming apparatus according to the present invention includes a photosensitive member rotatably mounted therein, a first image forming means for forming a first electrostatic latent image on the photosensitive member, a first developing means accommodating a first developer material for developing the first electrostatic latent image, a second image forming means for forming a second electrostatic latent image on the photosensitive member after development of the first electrostatic latent image by the first developing means, and a second developing means located downstream from the first developing means in a direction of rotation of the photosensitive member and provided with a developing roller having a magnetic force. The second developing means accommodates a second developer material for developing the second electrostatic latent image. The second developer material differs in color from the first developer material and has a magnetism greater than the first developer material. The second developer material is transported to the second electrostatic latent image on the photosensitive member by the developing roller so that the second electrostatic latent image may be formed.

The image forming apparatus according to the present invention further includes a collecting means provided in the second developing means and having a collecting member confronting the developing roller.

In the image forming apparatus having the above-described construction, the first developer material mixed in the second developer material transported by the developing roller is moved toward and collected by the collecting member under the influence of an electric field formed between the collecting member and developing roller.

In another aspect of the present invention, the first developer material may be so formed as to move toward the location having a higher potential when a potential difference greater than a first predetermined value is generated whereas the second developer material may be so formed as to move toward the location having a higher potential when a potential difference greater than a second predetermined value is generated.

In a further aspect of the present invention, the image forming apparatus is provided with an electric field forming means for alternately applying a direct current bias and an alternating current bias to the second developing means. The direct current bias is applied to the second developing means when an image is formed, thereby forming a first electric field at a location between the photosensitive member and the second developing means to move the second developer material onto the second electrostatic latent image. Furthermore, both the direct current bias and the alternating current bias are applied to the second developing means when no image is formed, thereby forming a second electric field at the location between the photosensitive member and the second developing means so that the first developer material mixed in the second developing means is collected on the photosensitive member.

In the above-described construction, when the second electric field is formed between the photosensitive member and the second developing means, the difference in developing threshold value is enlarged between two developer materials having different colors, thereby effectively removing the first developer material mixed in the second developing means.

In a still further aspect of the present invention, the image forming apparatus is provided with a selecting means for selecting either a first mode in which an image is formed by driving either the first or second developing means or a second mode in which an image is formed by driving both the first and second developing means, and a control means for prohibiting the collecting means from operating when the first mode is selected and for permitting the collecting means to operate when the second mode is selected.

According to this aspect of the present invention, the collecting means can be operated only when both the first and second developing means are used at the same time, thereby preventing the developer material accommodated in the second developing means from being wasted.

BRIEF DESCRIPTION OF THE DRAWINGS

This and other objects and features of the present invention will become apparent from the following description taken in conjunction with preferred embodiments thereof with reference to the accompanying drawings, in which:

FIG. 11 is a diagram similar to FIG. 5, according to the second embodiment of the present invention;

DESCRIPTION OF THE PREFERRED EMBODIMENTS

Figure 1:
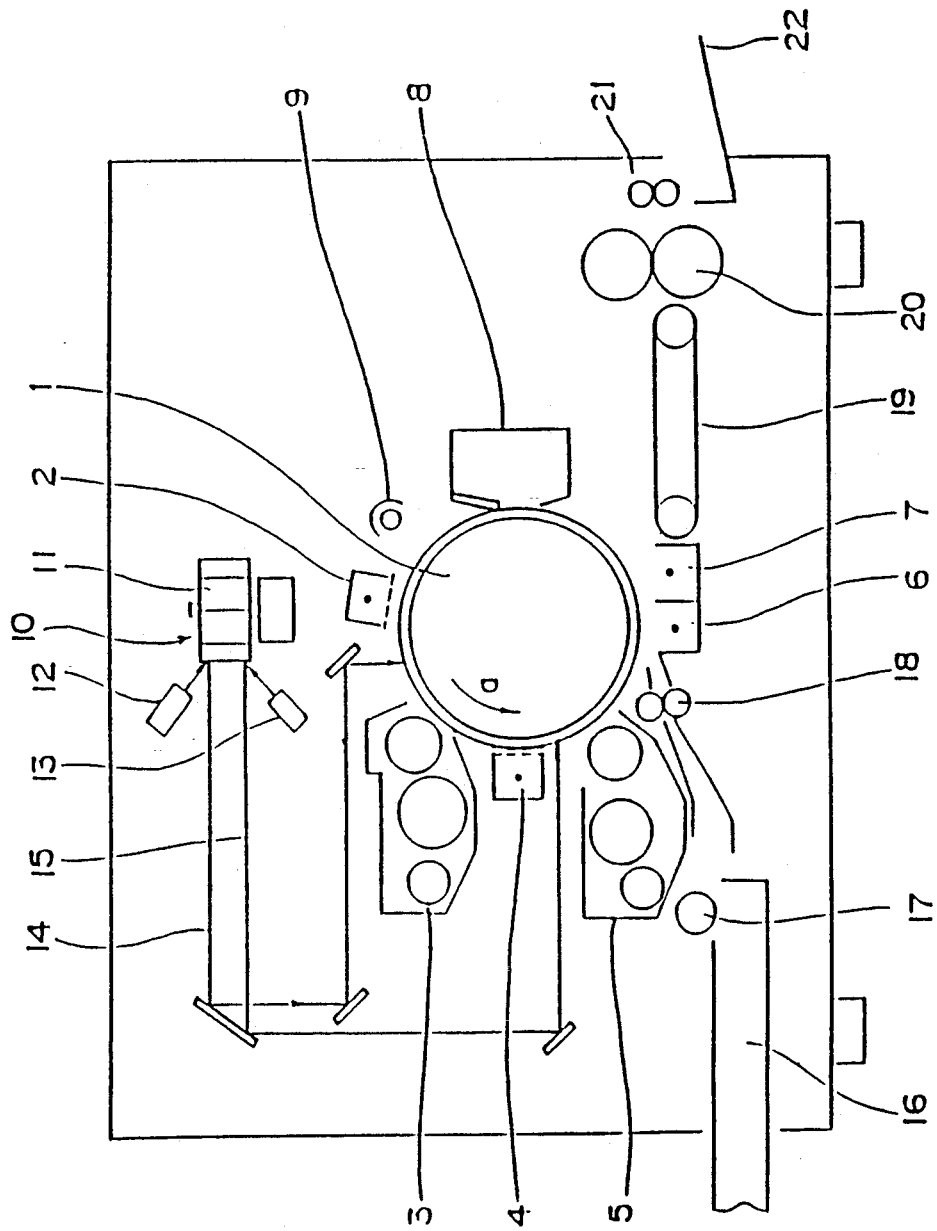
FIG. 1 is a schematic cross-sectional view of an image forming apparatus according to the present invention.

Before the description of the present invention proceeds, it is to be noted here that like parts are designated by like reference numerals throughout the accompanying drawings.

General Structure of an Image Forming Apparatus

Referring first to FIG. 1, an image forming apparatus of the present invention has a photosensitive body 1 provided substantially at the center thereof. The photosensitive body 1 is arranged to be rotated in a direction shown by an arrow (a).

Along the periphery of the photosensitive body 1, there are provided a first corona charger 2, a first developing device 3, a second corona charger 4, a second developing device 5, a transfer charger 6, a separating charger 7, a cleaning unit 8 and an eraser 9 sequentially in this order in a direction of rotation of the photosensitive body 1. Moreover, an optical system 10 including a rotary polyhedral mirror 11, a first laser head 12 and a second laser head 13 is provided above the photosensitive body 1. The image forming apparatus is further provided at the lower portion thereof with a paper feed unit 16, a paper feed roller 17 and a pair of timing rollers 18 at the left side of the transfer charger 6, and a transfer belt 19, a fixing device 20, a pair of paper discharge rollers 21 and a paper discharge tray 22 at the right side of the separating charger 7, as viewed in FIG. 1.

Figure 2:
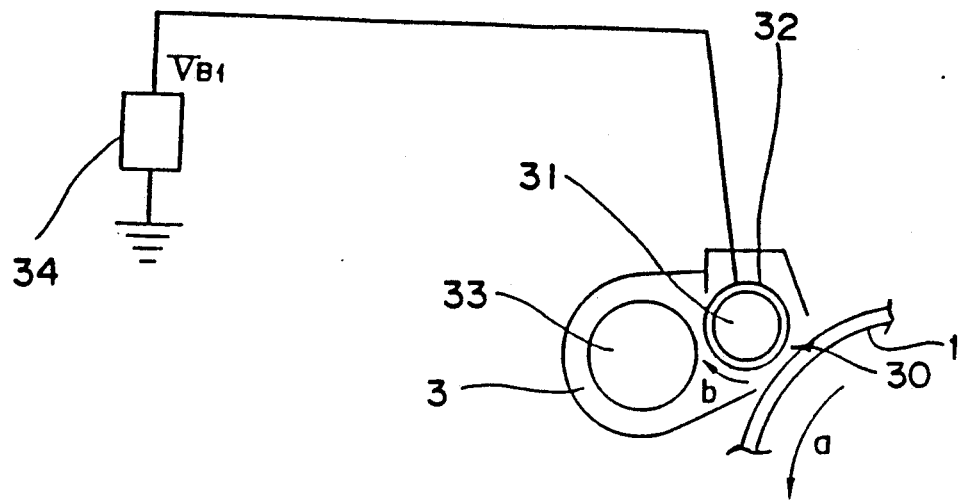
FIG. 2 is a schematic side view of a first developing device according to a first embodiment of the present invention.

As shown in FIG. 2, the first developing device 3 is of the magnetic brush type, which is provided with a developing roller 30 confronting the photosensitive body 1 and a developer supply member 33 and accommodates a first developer material consisting of carrier and red toner. The developing roller 30 includes a fixed magnetic roller 31 and a sleeve 32 rotatably mounted around the magnetic roller 31. A developing bias voltage $V_{B1}$ is applied to the sleeve 32 by a power source 34.

Figure 3:
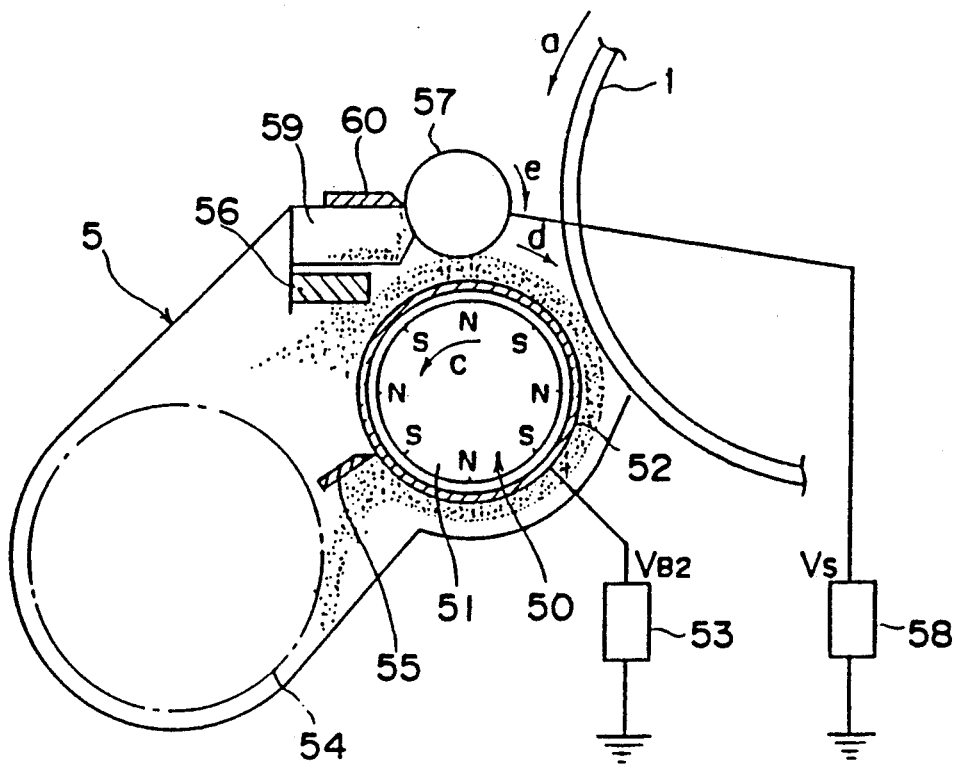
FIG. 3 is a side view, partly in section, of a second developing device according to a first embodiment of the present invention.

As shown in FIG. 3, the second developing device 5 is also of the magnetic brush type, which is provided with a developing roller 50 confronting the photosensitive body 1, a developer supply member 54, a separating roller 57 and a collecting container 59, and accommodates a second developer material consisting of carrier and black toner.

The developing roller 50 includes a magnetic roller 51 rotatable in a direction shown by an arrow (c) and a sleeve 52 fixedly mounted around the magnetic roller 51. A developing bias voltage $V_{B2}$ is applied to the sleeve 52 by a power source 53. A scraper 55 is interposed between the sleeve 52 and the developer supply member 54 and one end thereof is in contact with the surface of the sleeve 52. Above the scraper 55 is disposed a regulating plate 56 confronting the sleeve 52 at a predetermined interval.

The separating roller 57 can rotate in a direction shown by an arrow (e) and a separating bias voltage Vs is applied thereto by a power source 58.

The collecting container 59 has a scraper 60, one end of which is in contact with the surface of the separating roller 57.

Specific Conditions of Photosensitive Body and Developer Material (1) Photosensitive body
Type: OPC photosensitive drum
Diameter: 100 mm
System speed: 110 mm/sec.
(2) First developer material
Carrier:
  Average particle diameter: 60 μm
  Type: Spherical ferrite carrier
Toner:
  Average particle diameter: 11 μm
  Type: Non-magnetic toner
  Polarity: Negative (−)
Composition of toner:
  Styrene acrylic copolymer ... 100 parts by weight
  Controller agent for ... 4
  negative charge
  Red pigment ... 5
  * These components are melted and mixed, then cooled, crushed and classified, thereby obtaining the toner.
Toner density of the developer material (Tcl): 5 wt %
  * The toner density is the mixing ratio by weight of toner to carrier.
(3) Second developer material
Carrier:
  Average particle diameter: 58 μm
  Type: Binder-type carrier
  Polarity: Positive (+)
Toner:
  Average particle diameter: 12 μm
  Type: Magnetic toner
  Polarity: Negative (−)
Composition of toner:
  Styrene acrylic copolymer ... 100 parts by weight
  Controller agent for ... 5
  negative charge
  Carbon black ... 4
  Magnetic powder ... 40
  * The manufacturing method of toner is the same as the above first toner.
Toner density (Tcl): 15 wt %
(4) Potential relation
  * Potential of the photosensitive body charged by the first charger (V01) ... −600 (V)
  * Surface potential at the exposed portion of the photosensitive body by the first exposure (Vi1) ... −50 (V)
  First developing bias ($V_{B1}$) ... −450 (V)
  * Potential of the photosensitive body charged by the second charger (V02) ... −700 (V)
  * Surface potential at the exposed portion of the photosensitive body by the second exposure (Vi2) ... −60 (V)
  * Second developing bias ($V_{B2}$) ... −550 (V)
  * Separating bias (Vs) ... −480 (V)

Image Formation

Referring to FIG. 5, the image formation by the two-color image forming apparatus will be discussed hereinafter.

Figure 5A:
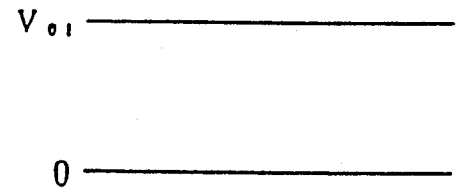
FIG. 5 is a potential diagram indicative of the potential on a photosensitive body.
Figure 5B:
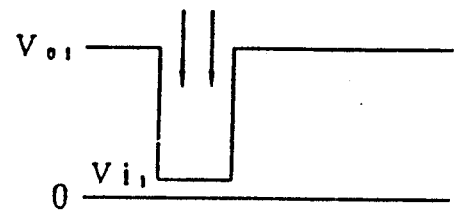

When the photosensitive body 1 is rotating in a direction shown by an arrow (a), the surface of the photosensitive body 1 is charged with V01 = −600 (V) by the first corona charger 2 (refer to FIG. 5a showing the first charging). The electrostatically charged area is then exposed to imaging light, thereby forming the first electrostatic latent image. In this event, the surface potential of the exposed portion (image portion) is rendered to be Vi1 = −50 (V) (refer to FIG. 5b showing the first exposure).

Figure 5C:
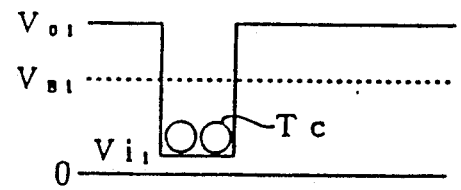

Subsequently, the first electrostatic latent image is developed by the first developing device 3 (refer to FIG. 5c showing the first development). In the first developing device 3, the first developer material is mixed by the developer supply member 33 and supplied to the sleeve 32 to form a magnetic brush under the influence of the magnetic force of the magnetic roller 31. The developer material is then transported in a direction of rotation of the sleeve 32, as shown by an arrow (b), towards the location confronting the photosensitive body 1. At this location, red toner Tc is charged with the negative (−) polarity on the basis of the potential difference between the developing bias $V_{B1}$ = −450 (V) and the surface potential Vi1 = −50 (V) of the exposed portion of the photosensitive body 1. The red toner Tc adheres to the electrostatic latent image formed on the photosensitive body 1 and is turned to a visible image as a red toner image.

Figure 5D:
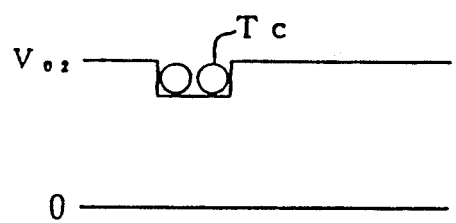
Figure 5E:
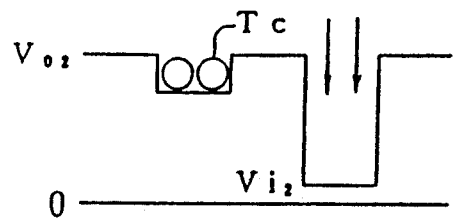

Thereafter, the surface of the photosensitive body 1 is charged with V02 = −700 (V) by the second corona charger 4 (refer to FIG. 5d showing the second charging). The electrostatically charged area is exposed to imaging light, thereby forming the second electrostatic latent image. In this event, the surface potential of the exposed portion (image portion) is rendered to be Vi2 = −60 (V) (refer to FIG. 5e showing the second exposure).

Figure 5F:
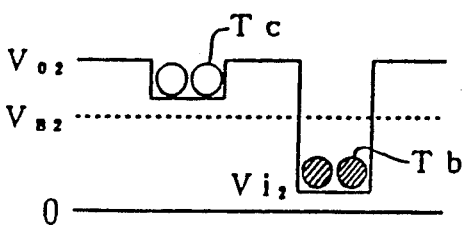

The second electrostatic latent image is developed by the second developing device 5 (refer to FIG. 5f showing the second development). In the second developing device 5, the second developer material is mixed by the developer supply member 54 and supplied to the sleeve 52 to form a magnetic brush under the influence of the magnetic force of the magnetic roller 51. The developer material is then transported in a direction shown by an arrow (d) along the periphery of the sleeve 52 on the basis of the rotation of the magnetic roller 51 as shown by an arrow (c). The amount of the developer material to be transported is regulated by the regulating plate 56 until the developer material reaches a developing region confronting the photosensitive body 1. At the developing region, black toner Tb is charged with the negative (−) polarity on the basis of the potential difference between the developing bias $V_{B2}$ = −550 (V) and the surface potential Vi2 = −60 (V) of the exposed portion of the photosensitive body 1. The black toner Tb adheres to the electrostatic latent image formed on the photosensitive body 1 and is turned to a visible image as a black toner image. The developer material, which has passed the developing region, is further transported in the direction shown by the arrow (d) and removed from the surface of the sleeve 52 by the scraper 55 at the location confronting the developer supply member 54.

The red and black toner images formed in this way are both transferred by the transfer charger 6 onto a transfer material fed from the paper feed unit 16. The transfer material with the toner images is then separated from the surface of the photosensitive body 1 by the separating charger 7 and sent to the fixing device 20 by the transfer belt 19. The toner images are fixed on the transfer material through the heating. Then, the transfer material is discharged on the discharge tray 22 by the discharge rollers 21.

On the other hand, after the toner images have been transferred onto the transfer material, remaining toner on the photosensitive body 1 are removed by the cleaning unit 8. The residual electric charge on the photosensitive body 1 is erased by the eraser 9 in preparation for the next image formation.

Toner Separation

In the above-described two-color image formation, when the second developer material is brought into contact with the red toner image formed by the first developing device 3 at the developing region of the second developing device 5, part of the red toner is occasionally removed by the second developer material. The removed red toner along with the second developer material is scraped off the surface of the sleeve 52 by the scraper 55 and mixed into the second developer material by the developer supply member 54.

Although the red toner removed by the second developer material mainly consists of toner having a weak adhesive force to the photosensitive body 1, i.e., insufficiently charged toner, such kind of insufficiently charged toner can also be charged enough through the contact with carrier in the second developer material. The red toner mixed into the second developer material is fed to the sleeve 52 by the developer supply member 54 and transported to the location confronting the separating roller 57.

A separating bias Vs = −480 (V) is applied to the separating roller 57 whereas a developing bias VB2 = −550 (V) is applied to the sleeve 52. Accordingly, there exists a potential difference of 70 (V) between the separating roller 57 and the sleeve 52, and the separating roller 57 is high in potential. This potential difference is hereinafter referred to as electrostatic contrast. The red and black toners charged with the negative (−) polarity are subjected to electric attraction directed to the separating roller 57 on the basis of the electrostatic contrast.

Figure 4:
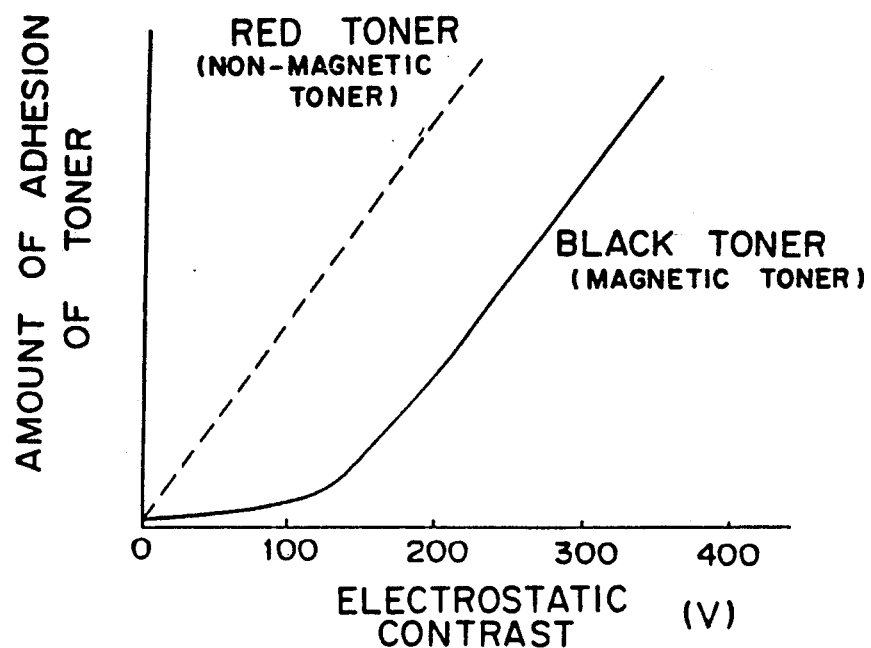
FIG. 4 is a graph showing the relation between the electrostatic contrast and the amount of adhesion of toner.

However, there exists a difference in developing threshold value between the red and black toners because only the black toner consists of magnetic toner. More specifically, as shown in FIG. 4, the amount of red toner particles to be transferred to the separating roller 57 is proportional to the degree of electrostatic contrast. The reason for this is that the red toner consists of non-magnetic toner and is, therefore, free from the magnetic attraction of the magnetic roller 51. In contrast, the black toner consists of magnetic toner and is subjected to the magnetic attraction of the magnetic roller 51. When the electrostatic contrast is less than approximately 100 (V), the magnetic attraction of the magnetic roller 51 is greater than the electric attraction, and therefore, the black toner hardly moves to the separating roller 57.

In this embodiment, since the electrostatic contrast is set to 70 (V), only the red toner moves to the separating roller 57. In other words, only the red toner mixed into the second developer material is selectively collected by the separating roller 57.

The red toner collected by the separating roller 57 is transported in a direction of rotation of the separating roller 57 shown by an arrow (e) and scraped off by the scraper 90 so as to be collected in the collecting container 59.

As a result, there does not arise the problem that the mixture of the red and black toners is supplied to an electrostatic latent image, thus contributing to the improvement of image quality without mixture of colors.

It is to be noted that in the above-described embodiment, although a specified difference in developing threshold value is provided between the first and second toners by the use of the first toner of non-magnetic toner and the second toner of magnetic toner, both the first and second toners may consist of magnetic toner. In such a case, the difference in developing threshold value can be provided between both the toners by making the magnetic force of the second toner greater than that of the first toner.

According to this embodiment of the present invention, since the first toner mixed in the second developing device is separated and collected by the separating roller, the first toner along with the second toner is not supplied from the second developing device to the photosensitive body, thereby eliminating mixture of colors in an image to be formed and enabling the improvement of image quality.

Figure 6:
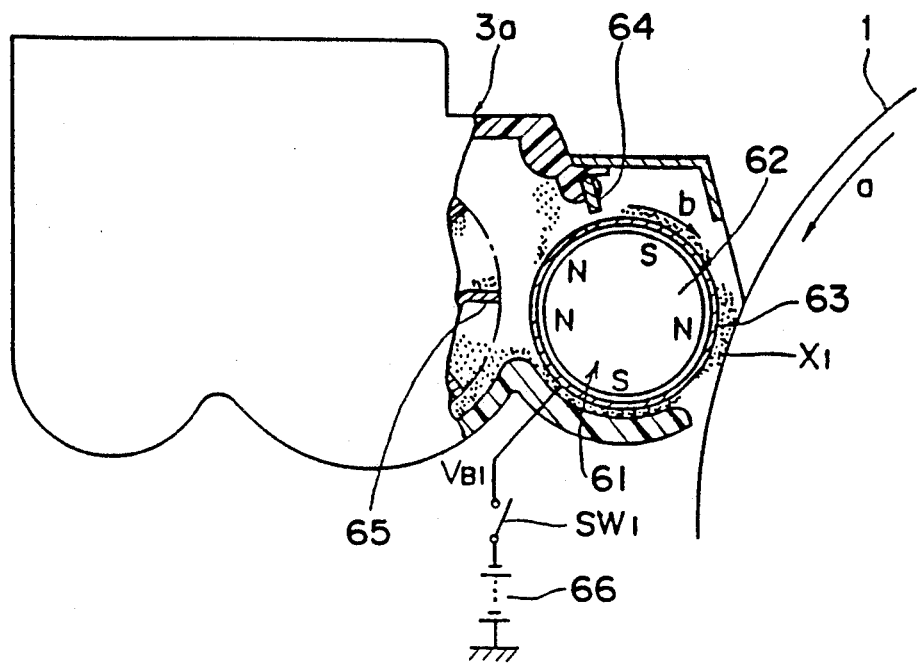
FIG. 6 is a side view, partly in section, of a first developing device according to a second embodiment of the present invention.
Figure 7:
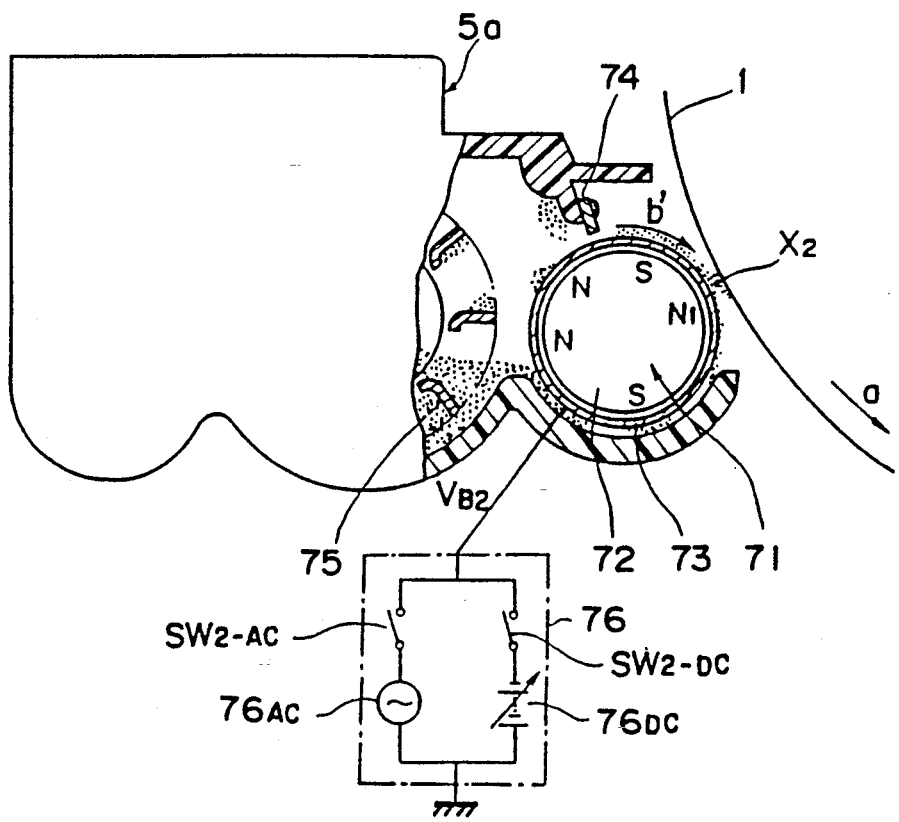
FIG. 7 is a side view, partly in section, of a second developing device according to the second embodiment of the present invention.

FIGS. 6 and 7 depict a first developing device 3a and a second developing device 5a, respectively, according to a second embodiment of the present invention.

As shown in FIG. 6, the first developing device 3a is of the magnetic brush type, which is provided with a developing roller 61 comprised of a magnet body 62 and a sleeve 63 rotatably mounted around the magnet body 62, and a developer supply member 65. The magnet body 62 is provided with a plurality of magnetic poles extending in the axial direction along the outer periphery thereof. Magnetic poles N, N having the same polarity are formed adjacent to each other at the location confronting the developer supply member 65. The sleeve 63 can rotate in a direction shown by an arrow (b) and connected to a power source 66 via a switch SW1 so that a direct current developing bias $V_{B1}$ may be applied to the sleeve 63 on the basis of a signal from a microcomputer MC (refer to FIG. 9) when the switch SW1 is turned on. Above the developing roller 61 is disposed a regulating plate 64, one end of which confronts the sleeve 63 with a predetermined interval being kept therebetween.

As shown in FIG. 7, the second developing device 5a is substantially of the same structure as the first developing device 3a. A sleeve 73 of the second developing device 5a is connected to a power source 76, specifically, to a direct current source 76 via a switch SW2-DC or an alternating current source 76 via a switch SW2-AC. When the switch SW2-DC or SW2-AC is turned on, a developing bias voltage or $V_{B2}$ ($V_{B2\text{-}DC}$ or $GV_{B2\text{-}AC}$) is applied to the sleeve 73 on the basis of a signal from the microcomputer MC.

Figure 8:
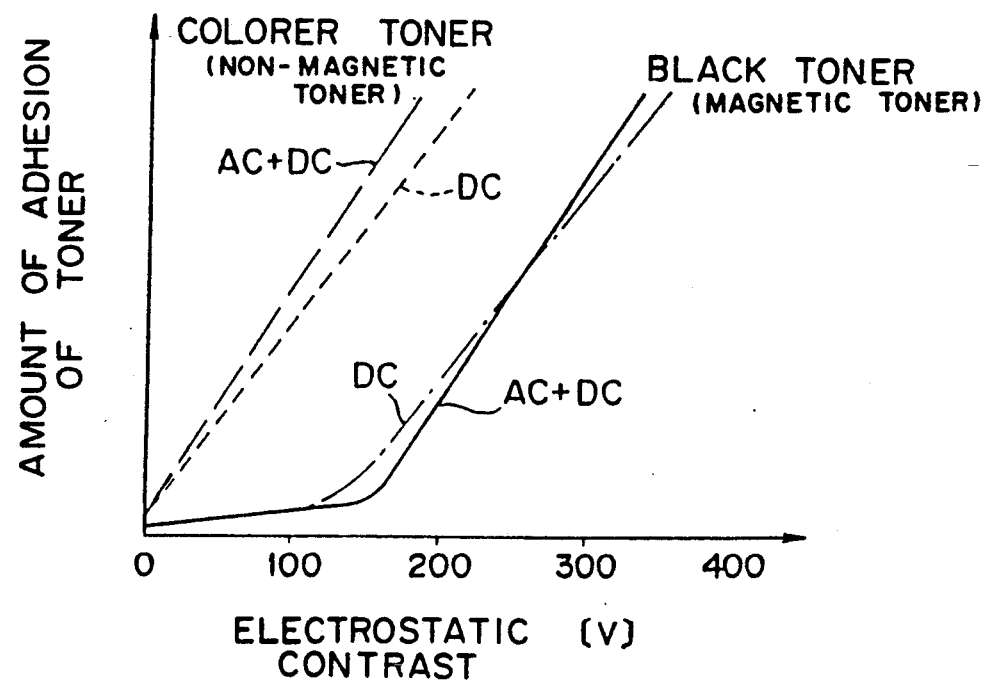
FIG. 8 is a graph similar to FIG. 4, according to the second embodiment of the present invention.

The first and second developing devices 3a and 5a of the above-described structure accommodate carrier and non-magnetic colored toner and, carrier and magnetic black toner, respectively. Since each of the developing devices accommodates a different kind of toner, these devices represent different developing characteristics, as is understood from a graph of FIG. 8. More specifically, in the first developing device 3a accommodating the non-magnetic colored toner, the amount of adhesion of toner rapidly increases from the state where the electrostatic contrast is 0 (V). This tendency of increase is proportional to the degree of electrostatic contrast. On the other hand, in the second developing device 5a accommodating the magnetic black toner, the amount of adhesion of toner is considerably small from 0 (V) to 100 (V) of the electrostatic contrast and gradually increases in accordance with the degree of electrostatic contrast after the electrostatic contrast exceeds approximately 100 (V). In other words, the developing threshold value is different between the colored toner and the black toner. Therefore, when the electrostatic contrast is less than 100 (V), a sufficient amount of the colored toner adheres to the photosensitive body 1 whereas the amount of adhesion of the black toner is small. In the graph of FIG. 8, "DC" represents the case where only a direct current is applied as the developing bias whereas "AC+DC" represents the case where a direct current connected in series with an alternating current is applied as the developing bias.

Specific Conditions of Photosensitive Body and Developer Material (1) Photosensitive body
   The conditions are the same as those in the first embodiment.
(2) First developer material
   The conditions are the same as those in embodiment.
(3) Second developer material
   The conditions are the same as those in the first embodiment.
(4) Potential relation
(i) At the time of toner image formation
* Potential of the photosensitive body charged by the first charger (V01) ... −600 (V)
* Surface potential at the exposed portion of the photosensitive body by the first exposure (Vi1) ... −50 (V)
* First developing bias ($V_{B1}$: direct current) ... −450 (V)
* Potential of the photosensitive body charged by the second charger (V02) ... −700 (V)
* Surface potential at the exposed portion of the photosensitive body by the second exposure (Vi2) ... −60 (V)
* Second developing bias ($V_{B2}$ : direct current only) ... −550 (V)
(ii) At the time of toner collection
* Potential of the photosensitive body charged by the first charger (V01') ... −600 (V)
* Second developing bias ($V_{B2}$: DC+AC)
   ($V_{B2'}$) ... $V_{B2-DC} + V_{B2-AC}$
   DC bias $V_{B2-DC} = -670$ (V)
   AC bias $V_{B2-AC} = 1500$ $_{P-P}$ (V)
   (Frequency: 1 KHz)
   (NOTE) "P—P" means a peak-to-peak value. The first developing device 3, the second corona charger 4, and the optical system 10 are out of operation.

Image Formation

Figure 9:
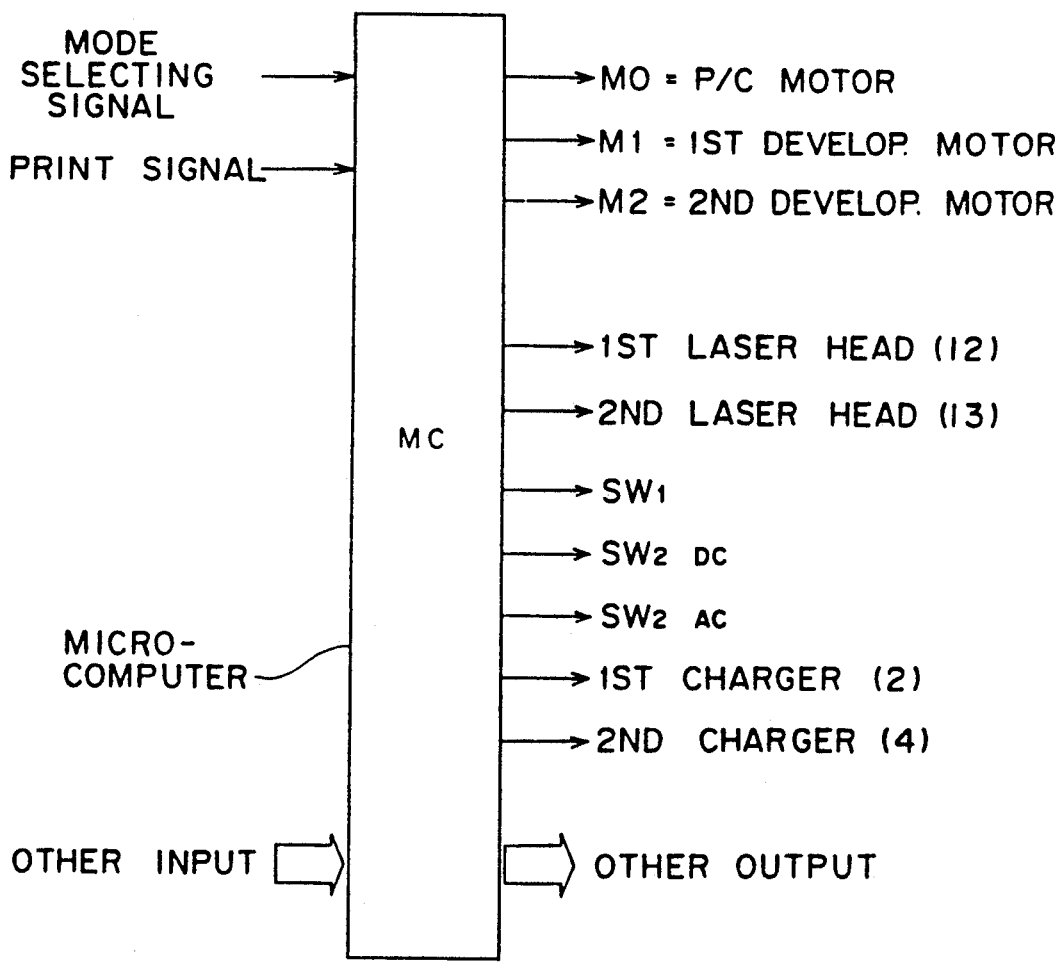
FIG. 9 is a circuit diagram of a control system according to the second embodiment of the present invention.

The operation of the image forming apparatus is entirely controlled by the microcomputer MC shown in FIG. 9 wherein M0, M1 and M2 are motors for driving the photosensitive body 1, the first developing device 3a and the second developing device 5a, respectively. When the microcomputer MC receives a printing order from a host computer (not shown), the microcomputer MC judges whether a single color printing mode or a two-color printing mode is selected. Either colored or black toner is used in the single color printing mode whereas both the colored and black toners are used in the two-color printing mode.

When the single color printing mode is selected, either the first developing device 3a or the second developing device 5a is selectively driven to perform the single color printing using either colored or black toner.

Figure 10:
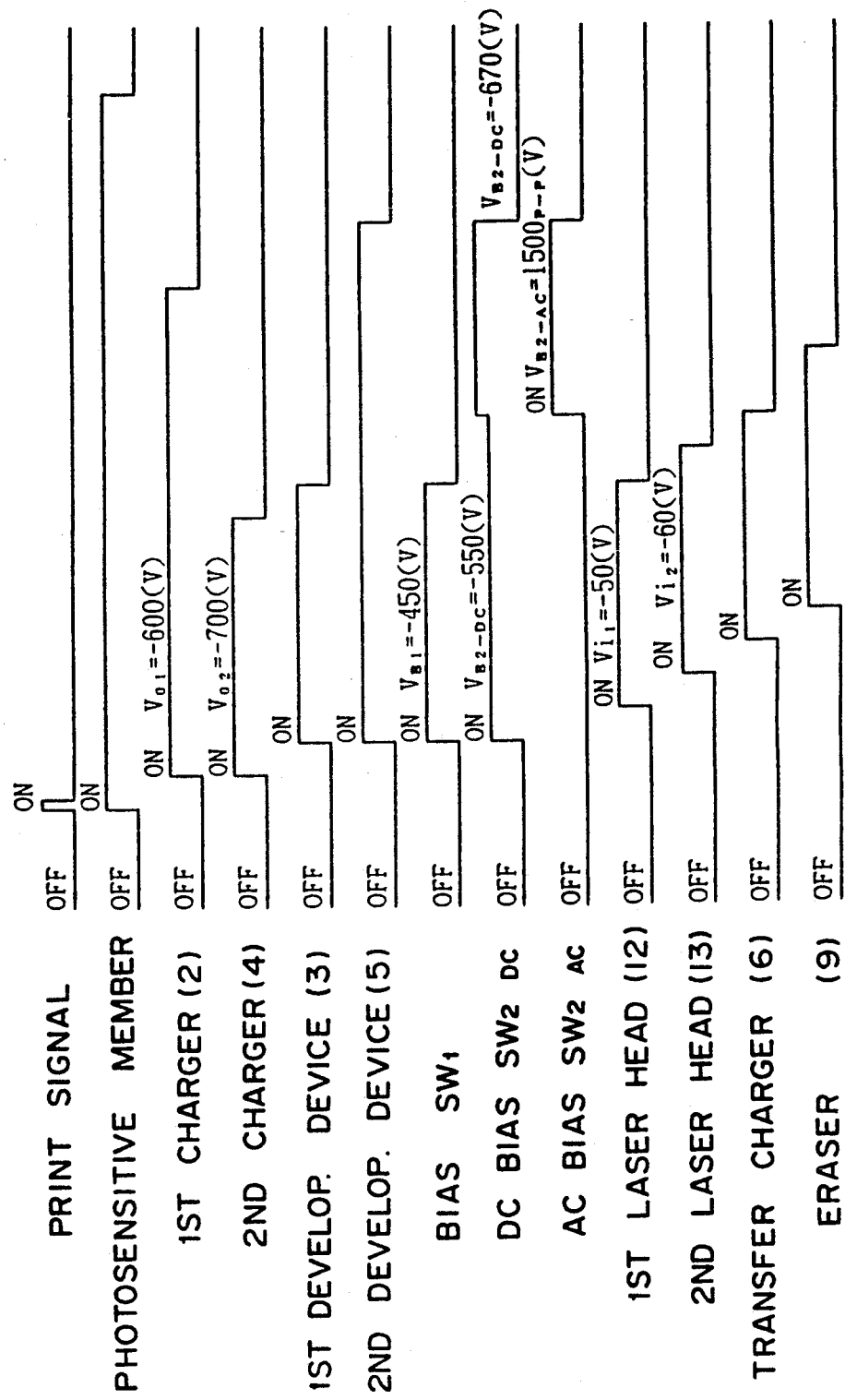
FIG. 10 is a time chart for performing the image formation in the apparatus according to the second embodiment of the present invention.

On the other hand, when the two-color printing mode is selected, two-color image formation is performed in accordance with a time chart as shown in FIG. 10. This image formation is substantially the same as that of the first embodiment but is discussed in detail hereinafter Upon input of a signal of a printing order, the motor M0 is driven to rotate the photosensitive body 1 in a direction of an arrow (a).

Subsequently, the first and second corona chargers 2 and 4 are turned on so that the surface of the photosensitive body 1 passing the chargers 2 and 4 is charged with V01 = −600 (V) and V02 = −700 (V) respectively (refer to FIG. 11a showing the first charging and to FIG. 11d showing the second charging). In the first and second developing devices 3a and 5a, the sleeves 63 and 73 are rotated by respective motors M1 and M2 in a direction shown by arrows (b) and (b,), respectively. Moreover, in the first developing device 3a, the developing bias $V_{B1} = -450$ (V) is applied to the sleeve 63 from the power source 66 when the switch SW1 is turned on. In the second developing device 5a, the direct current bias $V_{B2-DC} = -550$ (V) is applied to the sleeve 73 from the direct current power source $76_{DC}$ when the switch $SW_{2-DC}$ is turned on. In this case, the alternating current power source $76_{AC}$ is kept off.

Then, laser light 14 corresponding to a colored image is emitted to the rotary polyhedral mirror 11 from the first laser head 12. The reflected light is directed to the surface of the photosensitive body 1 between the first corona charger 2 and the first developing device 3a via a plurality of mirrors (refer to FIG. 11b showing the first exposure) so that a first electrostatic latent image may be formed at a portion of the photosensitive body 1 exposed to the reflected light and having a surface potential Vi1 = −50 (V). The first electrostatic latent image is turned into a visible image as a colored toner image by the first developing device 3a (refer to FIG. 11c showing the first development). In the first developing device 3a, the first developer material is fed to the sleeve 63 while being mixed by the developer supply member 65. The developer material fed to the sleeve 63 forms a magnetic brush under the influence of the magnetic force of the magnet body 62 and is transported in the direction of the arrow (b) with the rotation of the sleeve 63. The developer material then passes the regulating plate 64 and reaches the developing region X1 where the developer material confronts the photosensitive body 1. In the developing region X1, colored toner Tc charged with the negative (—) polarity adheres to the electrostatic latent image portion (exposed portion) on the photosensitive body 1 based on the electrostatic contrast 400 (V) between the developing bias $V_{B1} = -450$ (V) and the surface potential $Vi1 = -50$ (V), thereby turning the electrostatic latent image into a visible colored toner image. On the other hand, the movement of carrier is magnetically restricted by the magnet body 62 and the carrier hardly adheres to the photosensitive body 1 by the action of Coulomb's force. Even if the carrier adheres to the photosensitive body 1 through mechanical contact thereof with the photosensitive body 1, the amount of adhesion thereof is negligibly small. The developer material having passed the developing region X1 is further transported to the location confronting the developer supply member 65, where the developer material is released from the magnetic attraction of the magnet body 62 and separated from the surface of the sleeve 63.

Furthermore, laser light 15 is emitted to the rotary polyhedral mirror 11 from the second laser head 13 and is directed to the surface of the photosensitive body 1 between the second corona charger 4 and the second developing device 5a via a plurality of mirrors (refer to FIG. 11e showing the second exposure). In this event, the surface of the photosensitive body 1 is charged with $V02 = -700$ (V) by the second corona charger 4 and a second electrostatic latent image is formed at a portion of the photosensitive body 1 exposed to the laser light 15 and having a surface potential $Vi2 = -60$ (V). The second electrostatic latent image is turned into a visible image as a black toner image by the second developing device 5a at the developing region X2. In the second developing device 5a, the second developer material consisting of carrier and black toner is fed to the sleeve 73 while being mixed by the developer supply member 75. The developer material fed to the sleeve 73 forms a magnetic brush under the influence of the magnetic force of the magnetic roller 71. The developer material then passes the regulating plate 74 and reaches the developing region X2 where the developer material confronts the photosensitive body 1. In the developing region X2, black toner Tb charged with the negative (—) polarity adheres to the electrostatic latent image portion (exposed portion) on the photosensitive body 1 based on the electrostatic contrast 490 (V) between the developing bias $V_{B2-DC} = -550$ (V) and the surface potential $Vi2 = -60$ (V), thereby turning the electrostatic latent image into a visible black toner image (refer to FIG. 11f showing the second development). The reason why the electrostatic contrast 490 (V) in the developing region X2 is rendered greater than that 400 (V) in the developing region X1 is that the black toner is of magnetic toner and is subjected to the magnetic force of the magnet body 72, and therefore the electrostatic attraction to the black toner is required to be increased by enlarging the electrostatic contrast so that the image density may be maintained. On the other hand, the movement of carrier is magnetically restricted by the magnet body 72 and the carrier hardly adheres to the photosensitive body 1 by the action of Coulomb's force. Even if the carrier adheres to the photosensitive body 1 through mechanical contact thereof with the photosensitive body 1, the amount of adhesion thereof is negligibly small, as similar in the first developing device 3a.

Both the colored toner image and the black toner image formed on the photosensitive body 1 are transferred to a transfer material at the location confronting the transfer charger 6. The transfer material is introduced into the main body of the image forming apparatus by the paper feed roller 17 from the paper feed unit 16 and is transported to the location confronting the transfer charger 6 in synchronization with the toner images by the timing rollers 18.

The transfer material with the toner images is separated from the surface of the photosensitive body 1 by the separating charger 7 and sent to the fixing device 20 by the transfer belt 19. The toner images are then fixed on the transfer material by the heating.

Thereafter, the transfer material is discharged on the paper discharge tray 22 by the paper discharge rollers 21.

Residual toner on the photosensitive body 1 is removed by the cleaning unit 8 and the residual electric charge on the photosensitive body 1 is erased by the eraser 9 in preparation for the following first charging.

Collection of Toner

In the above-described two-color printing mode, when the photosensitive body 1 passes the developing region X2 of the second developing device 5a, the second developer material is brought into contact with the colored toner image formed by the first developing device 3a. As a result, the colored toner is partially captured by and mixed in the second developer material.

The collection of the colored toner mixed in the second developer material will be discussed hereinbelow.

Upon completion of formation of the toner images on the photosensitive body 1, the second corona charger 4, the first developing device 3a and the eraser 9 are turned off, with the first corona charger 2 and the second developing device 5a being kept on. In the second developing device 5a, the direct current bias is changed from $-550$ (V) to $-670$ (V) whereas the alternating current source $76_{AC}$ is turned on so that the alternating current bias $V_{B2-AC} = 1500_{P-P}$ (V) may also be applied to the sleeve 73.

Under such conditions, in the second developing device 5a, the colored toner as well as the black toner is mixed with the carrier and transported to the developing region X2 by the sleeve 73. Since the same charging controller agent is used for the colored toner and the black toner, both the toners tend to be charged with the same polarity with respect to the carrier, and therefore, the polarity of the colored toner mixed in the second developer material is not reversed.

In the developing region X2, the colored toner is collected by the photosensitive body 1 on the basis of the electrostatic contrast of 70 (V) between the potential $V02' = -600$ (V) of the photosensitive body 1 and the direct current bias $V_{B2-DC} = -670$ (V). On the other hand, the black toner is held on the sleeve 73 under the influence of the magnetic attraction of the magnet body 72 but extremely slightly adheres to the photosensitive body 1 on the basis of the force of mirror image or the like with respect thereto.

As mentioned above, both the direct current bias $V_{B2-DC}$ and the alternating current bias $V_{B2-AC}$ are applied as the developing bias $V_{B2}$, to the sleeve 73. Consequently, as indicated in the graph of FIG. 8, more colored toner can move to the photosensitive body 1 as compared with the case where only the direct current bias $V_{B2-DC}$ is applied. As a result, the efficiency for collecting the colored toner is raised and a large amount of colored toner can be collected within a relatively short time.

In the case of the black toner, the developing threshold value can be made larger by applying the alternating current bias $V_{B2-AC}$ in addition to the direct current bias $V_{B2-DC}$. Therefore, the electrostatic contrast can be raised to around 150 (V), thereby further increasing the amount of adhesion of the colored toner so that the colored toner can be effectively separated and collected from the second developer material within a short time.

When both the alternating current bias $V_{B2-AC}$ and the direct current bias $V_{B2-DC}$ are applied as the developing bias $V_{B2'}$, the force in a direction in which toner naturally moves is increased, thereby increasing the amount of adhesion of the toner.

The colored toner collected by the photosensitive body 1 in this way is further collected by the cleaning unit 8.

The above-discussed toner removal is performed for a given period of time until the next image formation is commenced. Thereafter, the first corona charger 2 and the second developing device 5a are turned off and the developing bias $V_{B2'}$ is changed to "0" (V).

According to the second embodiment of the present invention, the presence of an alternating electric field contributes to the effective collection of the first toner mixed in the second developing device and can considerably restrict the movement of the second toner to the photosensitive body at the time of collection of the first toner. It is, therefore, economical in that the second toner is not wasted.

Figure 12:
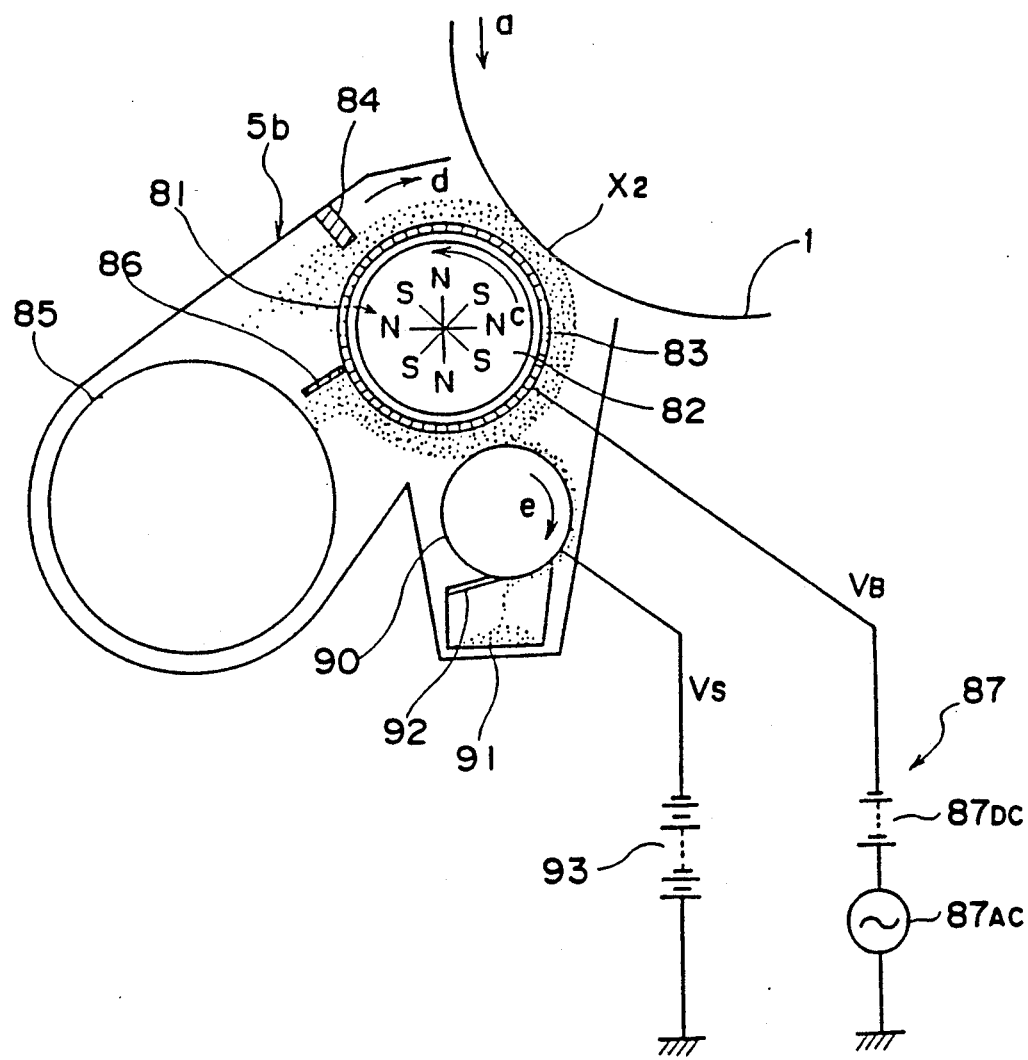
FIG. 12 is a side view, partly in section, of a second developing device according to a third embodiment of the present invention.

FIG. 12 depicts a second developing device 5b according to a third embodiment of the present invention.

In the second embodiment, although colored toner mixed in the second developing device 5a is collected by the photosensitive body 1, such toner may be collected by a collecting roller 90 disposed adjacent to a sleeve 83, as shown in FIG. 12.

In the developing device 5b, developer material consisting of carrier and magnetic black toner is supplied to a developing roller 81 by a developer supply member 85 and held on the surface of the sleeve 83 under the influence of the magnetic force of a magnet body 82. While the magnet body 82 and the sleeve 83 are rotating in a direction shown by an arrow (c) and in a direction shown by an arrow (d), respectively, the developer material held on the sleeve 83 is transported in the direction of the arrow (d). The developer material then passes a regulating plate 84 and reaches the developing region X2 where the developer material is brought into contact with the surface of the photosensitive body 1 to develop an electrostatic latent image. In this event, part of non-magnetic colored toner of the first developing device adhering to the photosensitive body 1 is removed by the developer material.

The developer material is then transported in the direction of the arrow (d) and reaches the location confronting the collecting roller 90. At this location, the non-magnetic colored toner is collected by the collecting roller 90 under the influence of the potential difference between a developing bias $V_B$ and a collecting bias Vs applied to the collecting roller 90, and the magnetic force of the magnet body 82. As shown in FIG. 12, a direct current power source $87_{DC}$ and an alternating current power source $87_{AC}$ connected in series are employed as a developing bias power source 87, thereby raising the efficiency for collecting the colored toner and a power source 93 is connected to the roller 90.

The colored toner collected by the collecting roller 90 is transported in a direction shown by an arrow (e) and collected in a collecting container 91 by a scraper 92.

On the other hand, the developer material on the sleeve 83 is removed by a scraper 86 at the location confronting the developer supply member 85.

In this embodiment, although the surface of the photosensitive body 1 is electrostatically charged by the first corona charger 2 at the time of toner removal, the surface of the photosensitive body 1 may be charged by the second corona charger 4. In this case, the potential of the photosensitive body 1 and the second developing bias are rendered to be, for example, $V_{02'} = -470$ (V) and $V_{B2'} = -550$ (V), respectively. In the case where the second corona charger 4 is provided with a potential controlling grid confronting the photosensitive body 1, the alteration of potential can be easily conducted by controlling the voltage applied to the grid.

When the toner removal immediately follows the image formation, a potential of $-30$ (V) still remains on the surface of the photosensitive body 1 after erasing light has been applied thereto from the eraser 9. Accordingly, the colored toner mixed in the second developing device 5b may be collected by making use of this residual potential, not using the corona charger. More specifically, on condition that an electrostatic contrast of $Vc_{2'} = 70$ (V) is provided between the photosensitive body 1 and the sleeve 83 by setting the direct current bias to $V_{B2} = -100$ (V), the colored toner can be removed based on this potential difference.

It is to be noted here that in this embodiment, although the collecting roller 90 is placed downstream from the developing region X2 and upstream from the developer supply member 85 as viewed in the direction of transportation of the developer material on the sleeve 83, the collecting roller 90 may be placed upstream from the developing region X2 and downstream from the developer supply member 85 viewed in the aforementioned direction.

As taught above with respect to FIGS. 6 and 7, the electric field forming means for applying a direct current bias and an alternating current bias to the developing roller of the second developing means can be utilized such that only the direct current bias is applied to the developing roller when an image is formed on the photosensitive member, and both the direct current bias and the alternating current bias can be applied to the developing roller when no image is formed on the photosensitive member.

Figure 13:
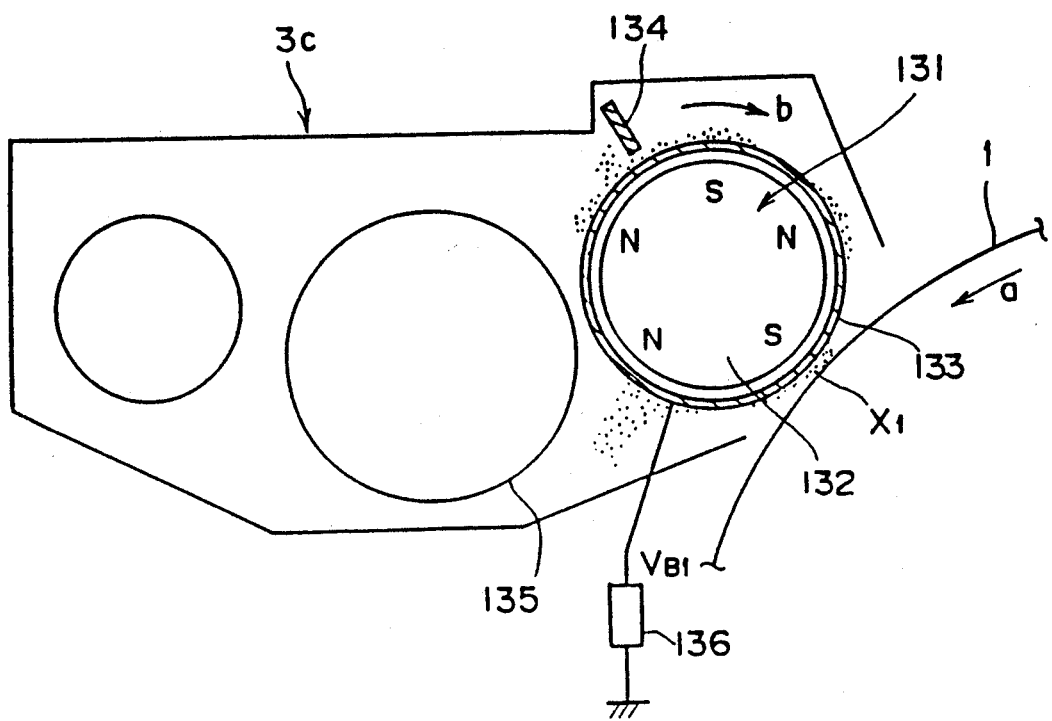
FIG. 13 is a side view, partly in section, of a first developing device according to a fourth embodiment of the present invention.
Figure 14:
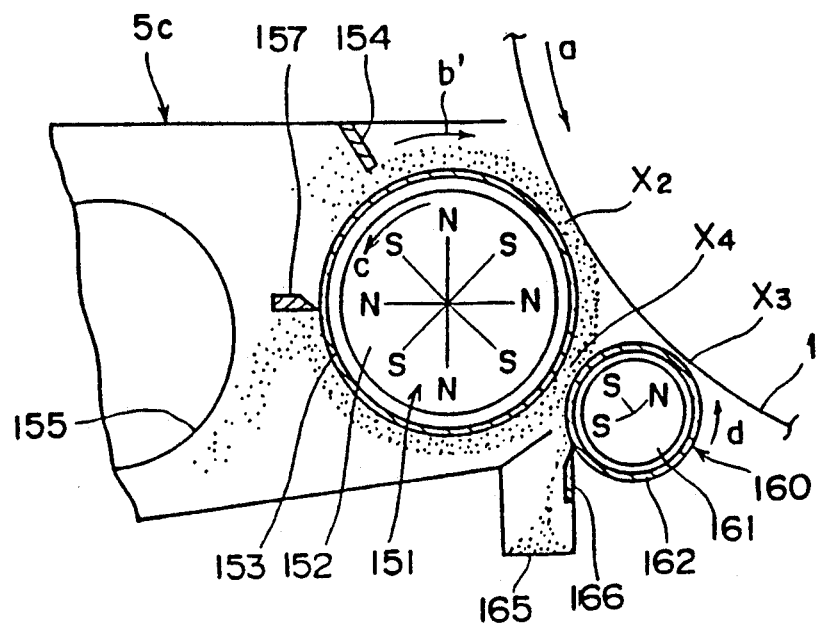
FIG. 14 is a side view, partly in section, of a second developing device according to the fourth embodiment of the present invention.
Figure 15:
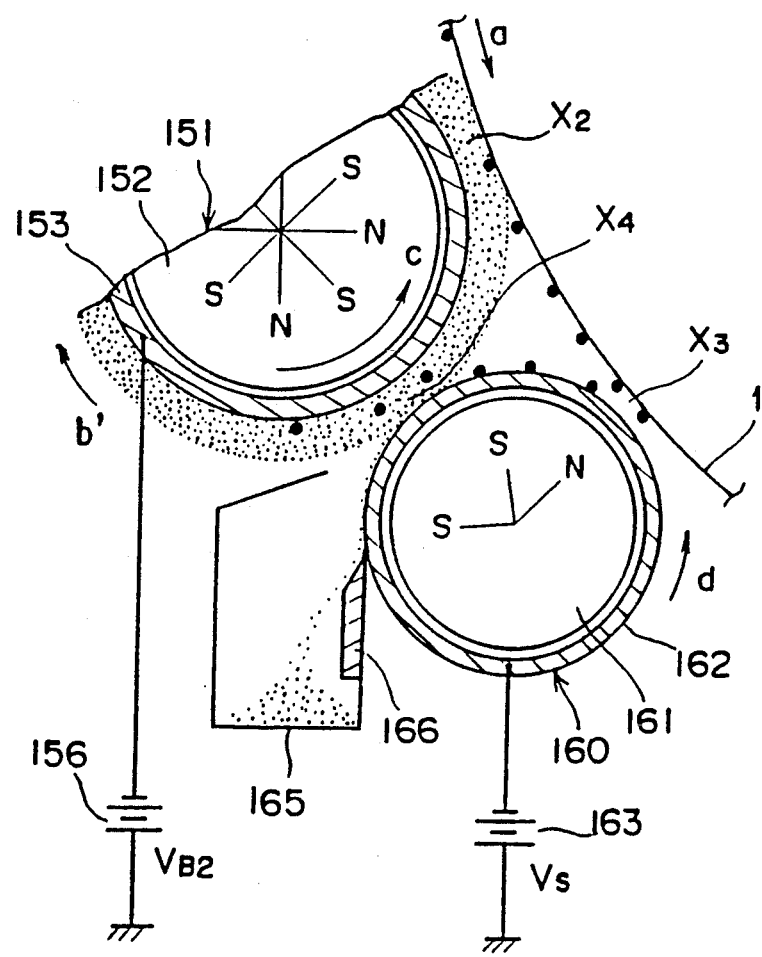
FIG. 15 is a fragmentary cross sectional view, on an enlarged scale, of the main portion of the second developing device of FIG. 14.

FIGS. 13 and 14 depict a first developing device 3c and a second developing device 5c, respectively, according to a fourth embodiment of the present invention. FIG. 15 depicts the main portion of the second developing device 5c.

As shown in FIG. 13, the first developing device 3c is of the magnetic brush type, which is provided with a fixed developing roller 131 comprised of a magnet body 132 and a sleeve 133 rotatably mounted around the magnet body 132, and a developer supply member 135. The magnet body 132 is provided with a plurality of magnetic poles extending in the axial direction along the outer periphery thereof. Two magnetic poles N and N are arranged adjacent to each other at the location confronting the developer supply member 135. The sleeve 133 can rotate in a direction shown by an arrow (b) and connected to a power source 136. A direct current developing bias $V_{B1}$ is applied to the sleeve 133 in compliance with a signal from a microcomputer MC (refer to FIG. 16). A regulating plate 134 is disposed above the sleeve 133 and spaced therefrom at a predetermined interval.

As shown in FIGS. 14 and 15, the second developing device 5c is also of the magnetic brush type, which is provided with a developing roller 151 comprised of a magnet body 152 and a sleeve 153 rotatably mounted around the magnet body 152, and a developer supply member 155. The magnet body 152 has a plurality of magnetic poles S and N alternately extending and equally spaced in the axial direction along the outer periphery thereof. The magnet body 152 can rotate in a direction shown by an arrow (c). The sleeve 153 is connected to a power source 156 and a developing bias $V_{B2}$ is applied thereto in compliance with a signal sent from the microcomputer MC. A scraper 157 is interposed between the sleeve 153 and the developer supply member 155 and one end thereof is in contact with the surface of the sleeve 153. Moreover, a regulating plate 154 is disposed above and spaced a predetermined distance from the sleeve 153.

A collecting roller 160 confronting both the sleeve 153 and the photosensitive body 1 is disposed below the location where the sleeve 153 and the photosensitive body 1 confront each other. The collecting roller 160 is comprised of a fixed magnet body 161 and a collecting sleeve 162 rotatably mounted around the magnet body 161. The magnet body 161 has a magnetic pole N confronting the photosensitive body 1 and two magnetic poles S confronting the developing roller 151. The magnetic force of the magnetic pole N is set to be 800-1000 Gauss. The collecting sleeve 162 is made of aluminum or the like in the form of a cylinder and can rotate in a direction shown by an arrow (d). The collecting sleeve 162 is connected to a power source 163 and a collecting bias Vs is applied thereto in compliance with a signal sent from the microcomputer MC. A container 165 is placed beside the collecting roller 160 and one end of a scraper 166 securely mounted on the container 165 is in contact with the surface of the collecting sleeve 162.

The first and second developing devices 3c and 5c accommodate carrier and non-magnetic colored toner, and carrier and magnetic black toner, respectively. Since each developing device accommodates a different kind of toner, these devices represent different developing characteristics, as previously understood from the graph of FIG. 4 or as similar to those shown in the graph of FIG. 8.

Specific Conditions of Photosensitive Body and Developer Material (1) Photosensitive body
The conditions are the same as those in the first embodiment.
(2) First developer material
Carrier:
 Average particle diameter: 58 μm
 Type: Binder type carrier
 Polarity: Positive (+)
 * Other conditions are the same as those in the first embodiment.
(3) Second developer material
 The conditions are the same as those in the first embodiment.
(4) Potential relation
 The conditions are the same as those in the first embodiment.

Image formation

Figure 16:
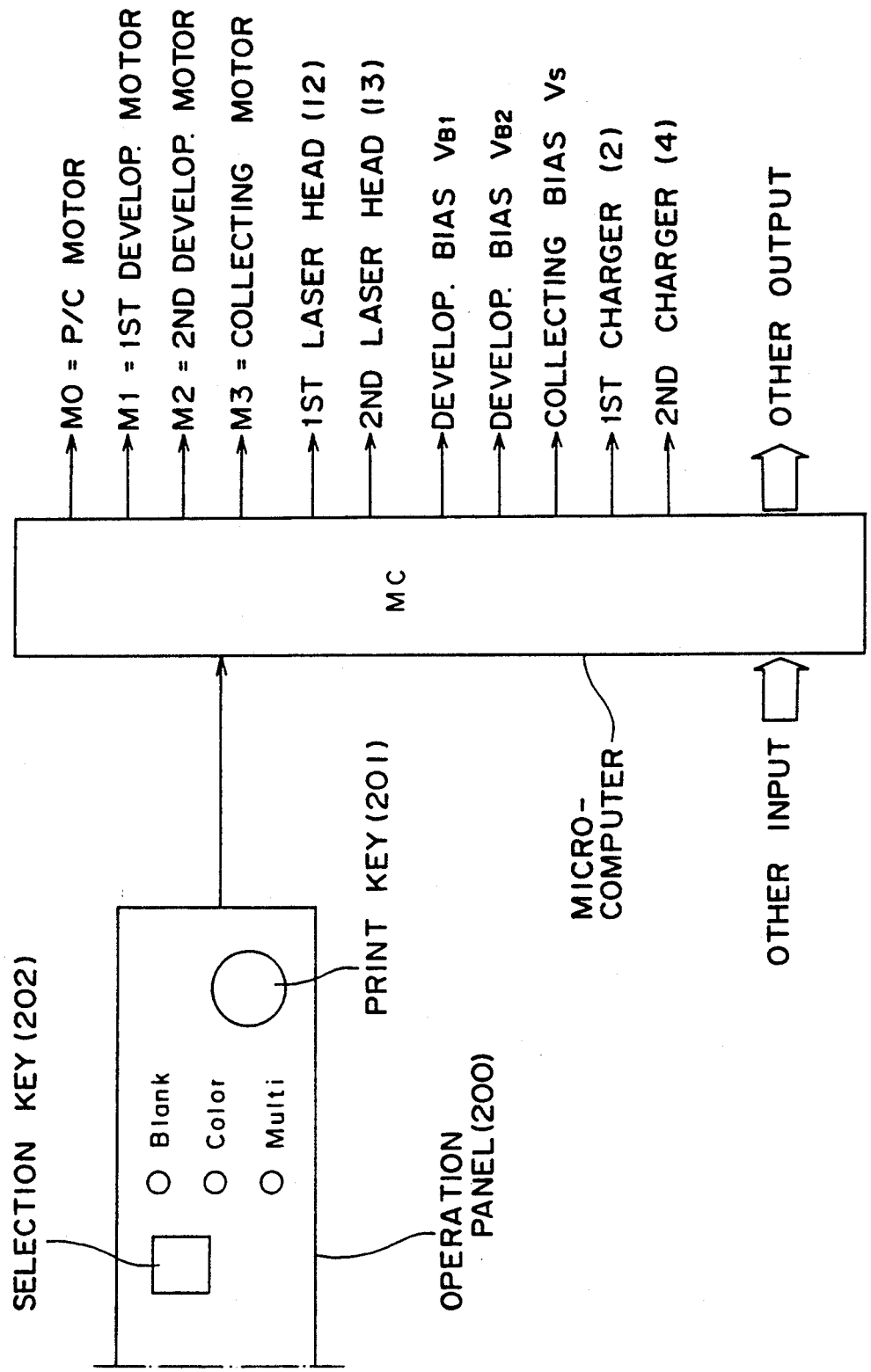
FIG. 16 is a diagram similar to FIG. 9, according to the fourth embodiment of the present invention.

The operation of the image forming apparatus is entirely controlled by the microcomputer MC shown in FIG. 16, wherein M0, M1, M2 and M3 are motors for driving the photosensitive body 1 and sleeves 133, 153 and 162, respectively. The image forming apparatus is equipped with an operation panel 200 having a print key 201 and a selection key 202. Manipulation of the selection key 202 can select any one of a black printing mode, a color printing mode and a two-color printing mode.

When a printing order is inputted from the operation panel 200 or a host computer (not shown), the microcomputer MC performs the following image formation in compliance with the selected printing mode.

Figure 17:
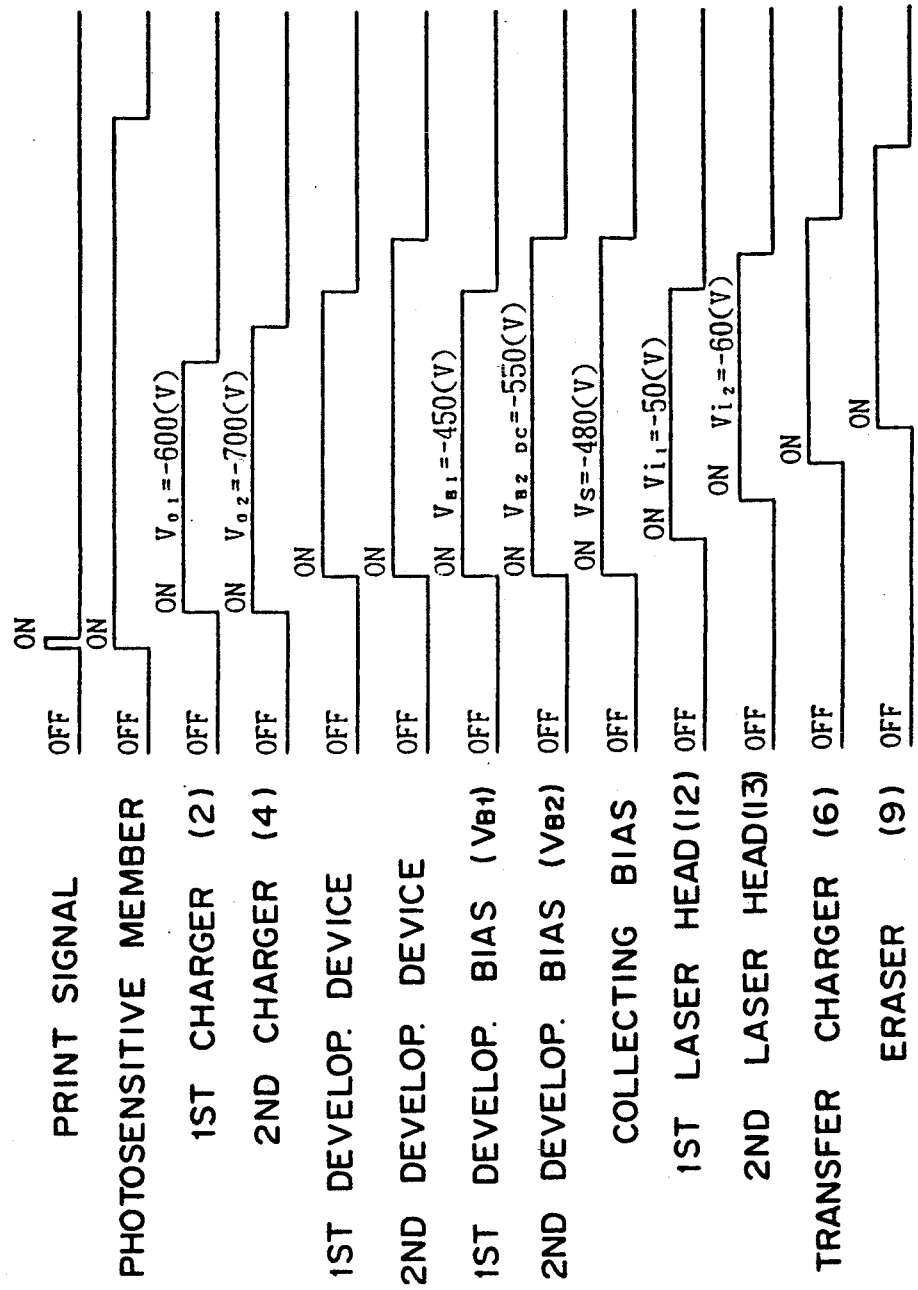
FIG. 17 is a time chart similar to FIG. 10, according to the fourth embodiment of the present invention.

(i) Two-color printing mode
In the event that the two-color printing mode is selected, the two-color image formation is performed in the order in accordance with a time-chart of FIG. 17.

Upon input of a signal of the printing order, the motor M0 is driven to rotate the photosensitive body 1 in a direction shown by an arrow (a).

Subsequently, the first and second corona chargers 2 and 4 are turned on so that the surface of the photosensitive body 1 passing the chargers 2 and 4 is charged with $V01 = -600$ (V) and $V02 = -700$ (V), respectively (refer to FIG. 5a showing the first charging and FIG. 5d showing the second charging). The motors M1, M2 and M3 rotate the sleeves 133, 153 and 163, respectively, in the first and second developing devices 3c and 5c. In the first developing device 3c, the developing bias $V_{B1} = -450$ (V) is applied to the sleeve 133 from the power source 136 whereas, in the second developing device 5c, the bias $V_{B2} = -550$ (V) is applied to the sleeve 153 from the power source 156. Furthermore, the collecting bias $Vs = -480$ (V) is applied to the collecting sleeve 162 from the power source 163.

Since the process of image formation in this embodiment is substantially the same as that of the foregoing embodiments, the description therefor is omitted for brevity's sake.

(ii) Single-color printing mode
In the event that the black color printing mode or the color printing mode is selected, only the first or the second developing device 3c or 5c is driven to obtain a single-color image. Detailed description of the image forming operation is abbreviated here.

It is to be noted that in the single-color printing mode, the motor M3 for driving the collecting roller 160 is stopped and the collecting bias Vs is not applied. Therefore, black toner accommodated in the second developing device 5c is never wasted by the collecting roller 60.

Collection of Toner

In the two-color printing mode, when the photosensitive body 1 passes the developing region X2 of the second developing device 5c, the second developer material is brought into contact with the colored toner image formed by the first developing device 3c. As a result, the colored toner is partially captured by and mixed with the second developer material held on the sleeve 153.

The colored toner captured by the second developer material along with the second developer material is transported in a direction shown by an arrow (b') by the sleeve 153 and reaches the location X4 confronting the collecting roller 160. This location is hereinafter referred to as a collecting region. In the collecting region X4, the colored toner and the black toner charged with the negative (−) polarity receive Coulomb's force directed to the collecting sleeve 162 having a higher potential based on the potential difference between the developing bias $V_{B2} = -550$ (V) applied to the sleeve 153 and the collecting bias $V_S = -480$ (V) applied to the collecting sleeve 162. Since the black toner is of magnetic toner, the black toner is restricted in movement by the magnetic force of the magnet body 152 and therefore never moves to the collecting sleeve 162. On the contrary, since the colored toner is of non-magnetic toner, the colored toner is not subjected to the magnetic force of the magnet body 152. Accordingly, the colored toner moves to the collecting sleeve 162 based on Coulomb's force.

The colored toner moved to the collecting sleeve 162 is transported in a direction shown by an arrow (d) by the sleeve 162. The colored toner is then removed from the surface of the sleeve 162 by the scraper 166 and collected in the collecting container 165.

Although the location of the collecting roller 160 is not restricted, the location according to this embodiment is advantageous in that since the colored toner removed in the developing region X2 exists in high density at this location, the colored toner can be effectively collected within a short time.

In the single-color printing mode, there is no fear that colors are mixed. Accordingly, black toner is not wasted by stopping the motor M3 for driving the collecting roller 160 without applying the collecting bias Vs.

Collection of Carrier

Carrier adhering to the photosensitive body 1 is collected in the following manner.

The carrier adhering to the surface of the photosensitive body 1 in the developing regions X1 and X2 is transported to the location X3 confronting the collecting roller 162. This location is hereinafter referred to as a carrier collecting region.

Since the photosensitive body 1 confronts a magnetic pole N of the magnet body 161 in the carrier collecting region X3, the carrier on the photosensitive body 1 is attracted by the magnetic pole N and moved to the collecting roller 160.

The carrier moved to the collecting roller 160 is held on the surface of the collecting sleeve 162 by the magnetic force of the magnet body 161. Thereafter, the carrier is moved in the direction of the arrow (d) in accordance with the rotation of the collecting sleeve 162 and reaches the collecting region X4.

In the collecting region X4, two magnetic poles S are formed adjacent to each other in the magnet body 161, thereby forming a repulsive magnetic field. This repulsive magnetic field separates the carrier from the collecting roller 160. The carrier is then attracted by the magnet body 152 of the developing roller 151 and moves to the developing roller 151. In this way, the carrier is captured by the second developer material. Furthermore, as the sleeve 153 is rotated, the carrier is transported in a direction shown by an arrow (b') and collected in the second developing device 5c.

In the monochromic, i.e., black color printing mode, when the collecting roller 160 is driven with the collecting bias $V_S = -600$ (V), the potential difference from the developing bias $V_B = -550$ (V) applied to the sleeve 153 makes it possible only to collect the carrier without consuming the black toner.

In the second developing device 5c according the above-described fourth embodiment, the developer material is transported by driving both the magnet body 152 and the sleeve 153 of the developing roller 151.

Figure 18:
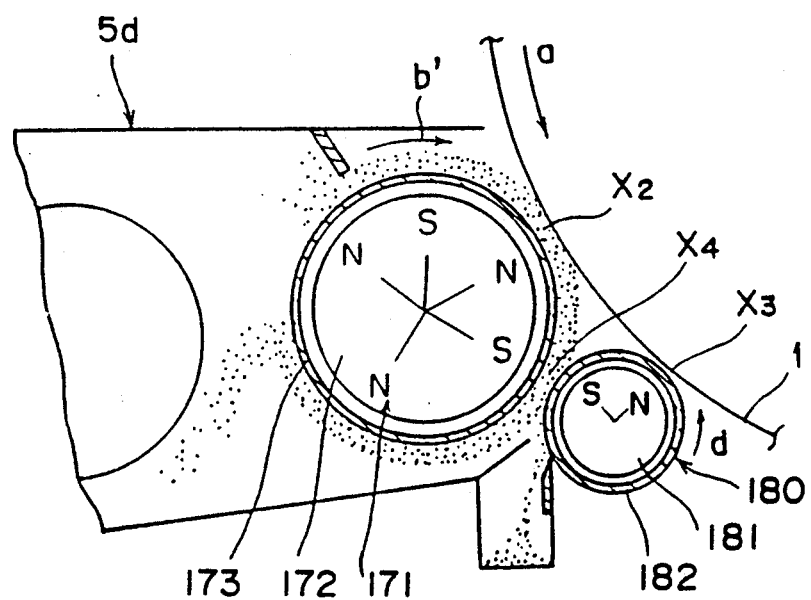
FIG. 18 is a view similar to FIG. 14, according to a fifth embodiment of the present invention.

However, a developing roller having the same structure as the developing roller 131 of the first developing device 3c can be also employed in the second developing device, as shown in FIG. 18 embodying a second developing device 5d according to the fifth embodiment of the present invention.

As shown in FIG. 18, it is not necessary to form two magnetic poles of the same polarity (S) adjacent to each other in a magnet body 181 of a collecting roller 180 at the location confronting the developing roller 171, but may be arranged so that the magnetic pole confronting the developing roller 171 is shifted in a direction opposite to the direction (d) from the position where the developing roller 171 is closest to the collecting roller 180. In such a case, the portion of the magnetic pole S having a reduced magnetic force is located closest to the developing roller 171. In this case also, the collected carrier is attracted by the magnet body 172 and moved to the developing roller 171. The third developing device 5D is also of the magnetic brush type with a sleeve 173 provided to the developing roller 171 and a sleeve 182 provided with the collecting roller 180. The regions X2, X3 and X4 correspond generally to the description of the developing region, the location referred to as a carrier collection region and the collecting region, respectively, in the same manner as the description of FIGS. 14 and 15. The photosensitive body 1 rotates in the direction of the arrow a.

As is described hereinabove, the first toner mixed in the second developer material is collected only when the two-color printing mode is selected. Since the amount of the second toner collected together with the first toner is small, the second toner is not wasted, thus contributing to the effective use of toner and the improvement of image quality without mixture of colors.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An image forming apparatus accommodating a photosensitive member rotatably mounted therein, said apparatus comprising:

a first developing means accommodating a first developer for developing at a first developing region a first electrostatic latent image formed on the photosensitive member;

a second developing means located downstream from said first developing means in a direction of rotation of said photosensitive member and provided with a developing roller having a magnetic force, said second developing means accommodating a second developer for developing at a second developing region a second electrostatic latent image, said second developer being different in color from said first developer and having a magnetism greater than said first developer, said second developer being transported to said second electrostatic latent image formed on said photosensitive member along a periphery of said developing roller so that said second electrostatic latent image is developed; and a collecting means provided in said second developing means at a position upstream from the second developing region with respect to the direction of the photosensitive member rotation and having a collecting member confronting said developing roller, whereby said first developer mixed in said second developer transported along the periphery of said developing roller is moved toward and collected by said collecting member under the influence of an electric field formed between said collecting member and developing roller.

2. The image forming apparatus as claimed in claim 1, wherein said second developer is moved by a potential difference greater than a predetermined value, said first developer being moved by a potential difference less than said predetermined value required for movement of said second developer, and wherein said electric field is formed by a potential difference greater than a minimum value required for movement of said first developer and less than a minimum value required for movement of said second developer.

3. The image forming apparatus as claimed in claim 1, further comprising a developer supply means, accommodated in said second developing means, for supplying said second developer to said developing roller, wherein said collecting means is located downstream from said developer supply means and upstream from a developing region in a direction of transportation of said developer, said developer being supplied on said second electrostatic latent image on said photosensitive member in said developing region.

4. The image forming apparatus as claimed in claim 1, wherein said collecting means is provided with a rotatable collecting roller for collecting said first developer and a collecting container for accommodating said first developer collected by said collecting roller, said first developer removed from said developing roller being held on said collecting roller by said electric field formed between said collecting roller and developing roller.

5. The image forming apparatus as claimed in claim 1, wherein said first and second developers have the same polarity.

6. An image forming apparatus accommodating a photosensitive member rotatably mounted therein, said apparatus comprising:

a first developing means accommodating a first developer for developing at a first developing region a first electrostatic latent image formed on the photosensitive member, said first developer moving toward a location having a higher potential when a potential difference greater than a first predetermined value is generated;

a second developing means located downstream from said first developing means in a direction of rotation of said photosensitive member and provided with a developing roller having a magnetic force, said second developing means accommodating a second developer for developing at a second developing region a second electrostatic latent image, said second developer being different in color from said first developer and moving toward a location having a higher potential when a potential difference greater than a second predetermined value is generated, said second developer being transported to a second electrostatic latent image formed on said photosensitive member along a periphery of said developing roller so that said a second electrostatic latent image is developed; and a collecting means provided in said second developing means at a position upstream from the second developing region with respect to the direction of the photosensitive member rotation and having a collecting member confronting said developing roller, whereby said first developer mixed in said second developing means is moved toward and collecting by said collecting member under the influence of an electric field formed between said collecting member and developing roller.

7. The image forming apparatus as claimed in claim 6, wherein said first developer includes non-magnetic toner and said second developer includes magnetic toner.

8. The image forming apparatus as claimed in claim 6, wherein said electric field is formed by a potential difference between a developing bias applied to said developing roller and a collecting bias applied to said collecting means, said potential difference being greater than said first predetermined value and less than said second predetermined value.

9. The image forming apparatus as claimed in claim 6, wherein each of said first and second developers is a two-component developer consisting of toner and carrier, the toner of said first developer having the same polarity as that of said second developer.

10. The image forming apparatus as claimed in claim 6, further comprising a developer supply means, accommodated in said second developing means, for supplying said second developer to said developing roller, wherein said collecting means is located downstream from said developer supply means and upstream from a developing region in a direction of transportation of said second developer, said developer being supplied on said second electrostatic latent image formed on said photosensitive member in said developing region.

11. An image forming apparatus accommodating a photosensitive member rotatably mounted therein, said apparatus comprising:

a first image forming means for forming a first electrostatic latent image on the photosensitive member;

a first developing means accommodating a first developer for developing said first electrostatic latent image, said first developer moving toward a location having a higher potential when a potential difference greater than a first predetermined value is generated;

a second image forming means for forming a second electrostatic latent image on said photosensitive member;

a second developing means located downstream from said first developing means in a direction of rotation of said photosensitive member and accommodating a second developer for developing said second electrostatic latent image, said second developer being different in color from said first developer and having the same polarity as said first developer, said second developer moving toward a location having a higher potential when a potential difference greater than a minimum value required for movement of said first developer is generated;

an electric field forming means for alternately applying a direct current bias and an alternating current bias to said second developing means, said direct current bias being applied to said second developing means where an image is formed on the photosensitive member, thereby forming a first electric field at a location between said photosensitive member and said second developing means to move said second developer onto said second electrostatic latent image, both said direct current bias and said alternating current bias being applied to said second developing means where no image is formed on the photosensitive member, thereby forming a second electric field at said location between said photosensitive member and said second developing means so that said first developer mixed in said second developing means is collected on said photosensitive member.

12. The image forming apparatus as claimed in claim 11, wherein each of said first and second developers is two-component developer consisting of carrier and toner.

13. The image forming apparatus as claimed in claim 12, wherein the toner in said first developer is non-magnetic toner whereas the toner in said second developer is magnetic toner.

14. The image forming apparatus as claimed in claim 11, wherein said first image forming means includes a first charging means and a first exposing means, while said second image forming means includes a second charging means and a second exposing means, either one of said first and second charging means electrostatically charges the surface of said photosensitive member when no image is formed.

15. An image forming apparatus accommodating a photosensitive member rotatably mounted therein, said apparatus comprising:

a first image forming means for forming a first electrostatic latent image on the photosensitive member;

a first developing means accommodating a first developer for developing said first electrostatic latent image, said first developer moving toward a location having a higher potential when a potential difference greater than a first predetermined value is generated;

a second image forming means for forming a second electrostatic latent image on said photosensitive member;

a second developing means located downstream from said first developing means in a direction of rotation of said photosensitive member and having a developing roller, said second developing means accommodating a second developer for developing said second electrostatic latent image, said second developer being different in color from said first developer and having the same polarity as said first developer, said second developer moving toward a location having a higher potential when a potential difference greater than a minimum value required for movement of said first developer is generated, said second developer being transported to said second electrostatic latent image formed on said photosensitive member along a periphery of said developing roller so that said second electrostatic latent image is formed;

a collecting means, provided in said second developing means, for collecting said first developer mixed in said second developing device; and an electric field forming means for alternately applying a direct current bias and an alternating current bias to said developing roller of said second developing means, only said direct current bias being applied to said developing roller where an image is formed on the photosensitive member, thereby moving said second developer on said developing roller to said second electrostatic latent image formed on said photosensitive member, both said direct current bias and said alternating current bias being applied to said developing roller where no image is formed on the photosensitive member, thereby forming an electric field at a location between said developing roller and said collecting means so that said first developer mixed in said second developing means is collected by said collecting means.

16. The image forming apparatus as claimed in claim 15, wherein each of said first and second developers is two-component developer consisting of carrier and toner.

17. The image forming apparatus as claimed in claim 16, wherein the toner in said first developer is non-magnetic toner whereas the toner in said second developer is magnetic toner.

18. The image forming apparatus as claimed in claim 15, wherein said first image forming means includes a first charging means and a first exposing means, while said second image forming means includes a second charging means and a second exposing means.

19. The image forming apparatus as claimed in claim 15, further comprising a developer supply means, accommodated in said second developing means, for supplying said second developer to said developing roller, wherein said collecting means is located downstream from said developer supply means and upstream from a developing region in a direction of transportation of said second developer, said developer being supplied on said second electrostatic latent image formed on said photosensitive member in said developing region.

20. An image forming apparatus accommodating a photosensitive member rotatably mounted therein, said apparatus comprising:

a first developing means accommodating a first developer for developing a first electrostatic latent image formed on said photosensitive member;

a second developing means located downstream from said first developing means in a direction of rotation of said photosensitive member and provided with a developing roller having a magnetic force, said second developing means accommodating a second developer for developing a second electrostatic latent image formed on said photosensitive member, said second developer being different in color from said first developer, and having the same polarity as the first developer and a magnetism greater than said first developer, said second developer being transported to said second electrostatic latent image formed on said photosensitive member along a periphery of said developing roller so that said second electrostatic latent image is formed;

a collecting means for collecting said first developer mixed in said second developing means; and an electric field forming means for alternately applying a direct current bias and an alternating current bias to said developing roller of second developing means, only said direct current bias being applied to said developing roller where an image is formed on the photosensitive member, thereby forming a first electric field at a location between said photosensitive member and said developing roller to move said second developer onto said second electrostatic latent image, both said direct current bias and said alternating current bias being applied to said developing roller where no image is formed on the photosensitive member, thereby forming a second electric field at a location between said developing roller and said collecting means so that said first developer mixed in said second developing means is collected by said collecting means.

21. The image forming apparatus as claimed in claim 20, wherein said collecting means has a predetermined potential.

22. The image forming apparatus as claimed in claim 21, wherein said first developer is moved by a potential difference greater than a first predetermined value, while said second developer is moved by a potential difference greater than a second predetermined value, said second predetermined value being greater than said first predetermined value, said second electric field being formed by a potential difference greater than said first predetermined value and less than said second predetermined value.

23. An image forming apparatus accommodating a photosensitive member rotatably mounted therein, said apparatus comprising:
   a first developing means accommodating a first developer for developing at a first developing region a first electrostatic latent image formed on said photosensitive member;
   a second developing means located downstream from said first developing means in a direction of rotation of said photosensitive member and accommodating a second developer for developing at a second developing region a second electrostatic latent image, said second developer being different in color from said first developer;
   a collecting means provided in said second developing means at a position upstream from the second developing region with respect to the direction of the photosensitive member rotation, for collecting said first developer mixed in said second developing means;
   a selecting means for selecting either a first mode in which an image is formed by driving either said first or second developing means or a second mode in which an image is formed by driving both said first and second developing means; and
   a control means for prohibiting said collecting means from operating when said first mode is selected and for permitting said collecting means to operate when said second mode is selected.

24. The image forming apparatus as claimed in claim 23, wherein said first developer includes non-magnetic toner and said second developer includes magnetic toner.

25. The image forming apparatus as claimed in claim 24, wherein each of said first and second developers is a two-component developer consisting of toner and carrier.

26. The image forming apparatus as claimed in claim 24, wherein said first developer is moved by a first potential difference, while said second developer is moved by a second potential difference greater than said first potential difference due to a difference in magnetic force between said first and second developers.

27. The image forming apparatus as claimed in claim 26, wherein a collecting means is provided with a collecting member confronting a developing roller provided in said second developing means, said developing roller transporting said second developer in a predetermined direction and wherein said first developer mixed in said second developer transported along a periphery of said developing roller is moved toward and collected by said collecting member under the influence of an electric field formed between said. collecting member and developing roller.

28. The image forming apparatus as claimed in claim 27, wherein said collecting member comprises a rotatable collecting roller, a magnetic roller provided in said collecting roller and a collecting container, and wherein said first developer mixed in said second developer is collected by said collecting roller, transported in a predetermined direction and collected in said collecting container, said collecting roller further collecting carrier adhering to said photosensitive member after development by said second developer.

29. An image forming apparatus accommodating a photosensitive member rotatably mounted therein, said apparatus comprising:
   a plurality of developing devices each of which is provided along a periphery of said photosensitive member, for developing at a developing region an electrostatic latent image formed on said photosensitive member, said developing devices accommodating respective developers having different colors;
   a collecting means provided in said developing devices at a position upstream from the developing regions with respect to a direction of rotation of said photosensitive member rotation except a developing device located upstream from any other developing devices in the direction of rotation of said photosensitive member, for collecting developers mixed from other developing devices;
   a selecting means for selecting either a first mode in which an image is formed by driving only one of said developing devices or a second mode in which an image is formed by driving at least two developing devices from a plurality of said developing devices; and
   a control means for prohibiting said collecting means from operating when said first mode is selected and for permitting said collecting means to operate when said second mode is selected.

30. In an image forming apparatus provided with a first developing device confronting a rotatable photosensitive member and second developing device confronting said photosensitive member and located downstream from said first developing device in a direction of rotation of said photosensitive member,
   a method for forming an image comprising the steps of:
   developing an electrostatic latent image formed on said photosensitive member by using a first developer accommodated in said first developing device;

supplying a second developer on a surface of a developing roller at a developer supply region in said second developing device, said second developer having a color different from said first developer and a magnetism greater than said first developer;

applying a direct current bias to said developing roller where an image is formed on the photosensitive member, thereby bringing said second developer held on said developing roller in contact with said electrostatic latent image at a developing region to develop said electrostatic latent image; and applying a direct current bias and an alternating current bias to said developing roller where no image is formed on the photosensitive member, thereby collecting the first developer mixed in said second developing device by making use of a difference in magnetic force between said first and second developers.

31. The method as claimed in claim 30, further comprising the step of:

collecting said first developer mixed in said second developing device onto a surface of said photosensitive member.

32. The method as claimed in claim 30, further comprising the step of:

collecting said first developer mixed in said second developing device by a collecting means provided in said second developing device, with a direct current bias being applied to said collecting means.

33. In an image forming apparatus provided with a first developing device confronting a rotatable photosensitive member and a second developing device confronting said photosensitive member and located downstream from said first developing device in a direction of rotation of said photosensitive member, said first developing device accommodating a first developer for developing at a first developing region a first electrostatic latent image formed on said photosensitive member, said second developing device accommodating a second developer for developing at a second developing region a second electrostatic latent image formed on said photosensitive member, said second developer having a color different from said first developer;

a method for forming an image comprising the steps of:

selecting either a first mode in which an image is formed by driving either said first or second developing means or a second mode in which an image is formed by driving both said first and second developing means;

collecting said first developer mixed in said second developing device by a collecting means provided in said second developing means at a position upstream of the second developing region with respect to a direction of the photosensitive member rotation;

prohibiting said collecting means from operating when said first mode is selected; and permitting said collecting means to operate when said second mode is selected.

34. An image forming apparatus accommodating a photosensitive member rotatably mounted therein, said apparatus comprising:

a first developing means accommodating a first developer for developing a first electrostatic latent image formed on the photosensitive member;

a second developing means accommodating a second developer for developing a second electrostatic latent image formed on the photosensitive member, said second developer having a color different from the first developer and a bias voltage for the second developer being higher than that for the first developer;

wherein said photosensitive member acts as a collecting means for collecting the first developer mixed in the second developing means when no image is formed on the photosensitive member; and applying means for applying to the second developing means a direct current bias to which an alternating current bias is superposed so that a predetermined electric field is formed between the second developing means and the collecting means, whereby only the first developer mixed in the second developing means is collected by the collecting means.

* * * * *